United States Patent
Jiang et al.

(10) Patent No.: US 12,482,400 B2
(45) Date of Patent: Nov. 25, 2025

(54) SHIFT REGISTER UNIT, GATE DRIVING CIRCUIT, AND DISPLAY APPARATUS

(71) Applicants: Wuhan BOE Optoelectronics Technology Co., Ltd., Hubei (CN); BOE Technology Group Co., Ltd., Beijing (CN)

(72) Inventors: Peng Jiang, Beijing (CN); Xiaoxiao Chen, Beijing (CN); Yun Li, Beijing (CN); Ning Zhu, Beijing (CN); Jiantao Liu, Beijing (CN)

(73) Assignees: Wuhan BOE Optoelectronics Technology Co., Ltd., Hubei (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/691,778

(22) PCT Filed: Sep. 21, 2022

(86) PCT No.: PCT/CN2022/120228
§ 371 (c)(1),
(2) Date: Mar. 13, 2024

(87) PCT Pub. No.: WO2023/071633
PCT Pub. Date: May 4, 2023

(65) Prior Publication Data
US 2024/0321172 A1   Sep. 26, 2024

(30) Foreign Application Priority Data
Oct. 26, 2021 (CN) .......................... 202111245661.7

(51) Int. Cl.
G09G 3/20 (2006.01)
G11C 19/28 (2006.01)

(52) U.S. Cl.
CPC ... *G09G 3/2092* (2013.01); *G09G 2310/0267* (2013.01); *G09G 2310/0286* (2013.01); *G09G 2310/08* (2013.01); *G11C 19/287* (2013.01)

(58) Field of Classification Search
CPC ...... G09G 3/20; G09G 3/2092; G09G 3/3266; G09G 3/3677; G09G 2310/0267;
(Continued)

(56) References Cited

U.S. PATENT DOCUMENTS

| | | | |
|---|---|---|---|
| 2011/0298771 A1* | 12/2011 | Yoo | G09G 3/20 345/211 |
| 2012/0139883 A1 | 6/2012 | Lee et al. | |

(Continued)

FOREIGN PATENT DOCUMENTS

| | | |
|---|---|---|
| CN | 105096902 A | 11/2015 |
| CN | 106205538 A | 12/2016 |

(Continued)

OTHER PUBLICATIONS

International Search Report, mailed Dec. 15, 2022, from PCT International Application No. PCT/CN2022/120228.

*Primary Examiner* — Ryan A Lubit
(74) *Attorney, Agent, or Firm* — Workman Nydegger

(57) ABSTRACT

An apparatus that includes a shift register unit, a gate driving circuit, and a display apparatus. The shift register unit includes: an input circuit, a reset circuit, a node control circuit, a cascade output circuit and a drive output circuit, where the drive output circuit is configured to provide the signal of the clock signal end to a drive output end in response to the signals of the first node.

19 Claims, 21 Drawing Sheets

(58) Field of Classification Search
CPC ....... G09G 2310/0286; G09G 2310/08; G11C 10/28; G11C 10/287
See application file for complete search history.

(56) References Cited

U.S. PATENT DOCUMENTS

| | | | | |
|---|---|---|---|---|
| 2018/0190223 A1* | 7/2018 | Zeng | .................... | G09G 3/3677 |
| 2018/0204628 A1* | 7/2018 | Gao | .................... | G11C 19/184 |
| 2018/0337682 A1* | 11/2018 | Takasugi | ................ | H03K 21/18 |
| 2019/0096308 A1* | 3/2019 | Lv | .......................... | G11C 19/28 |
| 2019/0096313 A1* | 3/2019 | Zhang | .................... | G09G 3/20 |
| 2019/0096500 A1* | 3/2019 | Gu | .......................... | G09G 3/20 |
| 2019/0103049 A1* | 4/2019 | Noh | ..................... | G09G 3/2092 |
| 2019/0108809 A1* | 4/2019 | Zheng | .................... | G09G 3/20 |
| 2019/0206503 A1* | 7/2019 | Zhang | .................... | G09G 3/20 |
| 2019/0392916 A1* | 12/2019 | Gu | .......................... | G09G 3/20 |
| 2020/0020266 A1* | 1/2020 | Feng | ..................... | G11C 19/28 |
| 2020/0051655 A1* | 2/2020 | Dong | .................... | G09G 3/3677 |
| 2020/0135287 A1* | 4/2020 | Han | ..................... | G09G 3/3677 |
| 2020/0168171 A1* | 5/2020 | Zheng | .................... | G09G 3/3614 |
| 2020/0168284 A1* | 5/2020 | Yu | .......................... | G06F 3/0412 |
| 2020/0168285 A1* | 5/2020 | Chen | ..................... | G11C 19/28 |
| 2020/0258554 A1* | 8/2020 | Qian | .................... | G11C 7/1051 |
| 2021/0020089 A1* | 1/2021 | Huang | ................ | G09G 3/3677 |

FOREIGN PATENT DOCUMENTS

| | | |
|---|---|---|
| CN | 107507599 A | 12/2017 |
| CN | 109166600 A | 1/2019 |
| CN | 110246447 A | 9/2019 |
| CN | 110322848 A | 10/2019 |
| CN | 110875002 A | 3/2020 |
| CN | 110880304 A | 3/2020 |
| CN | 113744679 A | 12/2021 |
| JP | 2008287753 A | 11/2008 |

* cited by examiner

SHIFT REGISTER UNIT, GATE DRIVING CIRCUIT, AND DISPLAY APPARATUS

CROSS REFERENCE TO RELATED APPLICATIONS

The disclosure is a National Stage of International Application No. PCT/CN2022/120228, filed Sep. 21, 2022, which claims the priority to Chinese Patent Application No. 202111245661.7, filed to the China National Intellectual Property Administration on Oct. 26, 2021, which are incorporated in their entireties herein by reference.

TECHNICAL FIELD

The disclosure relates to the field of display technology, and particularly relates to a shift register unit, a gate driving circuit and a display apparatus.

BACKGROUND

With the rapid development of display technology, display apparatuses are developed toward high integration and low cost. Thin Film Transistors (TFTs) are integrated on an array substrate of a display apparatus by the technology of Gate Driver on Array (GOA) to form a gate driving circuit, thereby realizing a scanning drive for the display apparatus. The driving circuit generally includes a plurality of cascaded shift register units. However, output of the shift register unit is unstable, resulting in abnormal display.

SUMMARY

A shift register unit provided by embodiments of the disclosure includes: an input circuit configured to provide a signal from a second input signal terminal to a first node in response to a signal from a first input signal terminal; a reset circuit configured to provide a signal from a first reference signal terminal to the first node in response to a signal from a reset signal terminal; a node control circuit configured to at least adjust a level of the signal at the first node according to a signal from a second reference signal terminal and a signal from a third reference signal terminal; a cascade output circuit configured to provide a signal from a clock signal terminal to a cascade output terminal in response to the signal at the first node; and a driving output circuit configured to provide the signal from the clock signal terminal to a driving output terminal in response to the signal at the first node.

In some examples, the input circuit includes: a first transistor. A gate of the first transistor is electrically connected with the first input signal terminal, a first electrode of the first transistor is electrically connected with the second input signal terminal, and a second electrode of the first transistor is electrically connected with the first node.

In some examples, the first input signal terminal and the second input signal terminal are the same one signal terminal; or the first input signal terminal and the second input signal terminal are signal terminals independent of each other.

In some examples, the reset circuit includes a second transistor. A gate of the second transistor is electrically connected with the reset signal terminal, a first electrode of the second transistor is electrically connected with the first reference signal terminal, and a second electrode of the second transistor is electrically connected with the first node.

In some examples, the cascade output circuit includes a third transistor. A gate of the third transistor is electrically connected with the first node, a first electrode of the third transistor is electrically connected with the clock signal terminal, and a second electrode of the third transistor is electrically connected with the cascade output terminal.

In some examples, the node control circuit includes: a fourth transistor, a fifth transistor, a sixth transistor, and a seventh transistor. A gate and a first electrode of the fourth transistor are both electrically connected with the third reference signal terminal, and a second electrode of the fourth transistor is electrically connected with a gate of the fifth transistor. A first electrode of the fifth transistor is electrically connected with the third reference signal terminal, and a second electrode of the fifth transistor is electrically connected with a second node. A gate of the sixth transistor is electrically connected with the first node, a first electrode of the sixth transistor is electrically connected with the second reference signal terminal, and a second electrode of the sixth transistor is electrically connected with the second node. A gate of the seventh transistor is electrically connected with the second node, a first electrode of the seventh transistor is electrically connected with the second reference signal terminal, and a second electrode of the seventh transistor is electrically connected with the first node.

In some examples, the second reference signal terminal and the first reference signal terminal are the same one signal terminal; or, the second reference signal terminal and the first reference signal terminal are signal terminals independent of each other, and a voltage of the second reference signal terminal is smaller than a voltage of the first reference signal terminal.

In some examples, the driving output circuit includes: an eighth transistor and a first capacitor. A gate of the eighth transistor is electrically connected with the first node, a first electrode of the eighth transistor is electrically connected with the clock signal terminal, and a second electrode of the eighth transistor is electrically connected with the driving output terminal. A first electrode plate of the first capacitor is electrically connected with the first node, and a second electrode plate of the first capacitor is electrically connected with the driving output terminal.

In some examples, the driving output circuit is further configured to provide a signal from a fourth reference signal terminal to the driving output terminal in response to the signal at a second node.

In some examples, the driving output circuit includes: a ninth transistor, a tenth transistor and a second capacitor. A gate of the ninth transistor is electrically connected with the first node, a first electrode of the ninth transistor is electrically connected with the clock signal terminal, and a second electrode of the ninth transistor is electrically connected with the driving output terminal. A gate of the tenth transistor is electrically connected with the second node, a first electrode of the tenth transistor is electrically connected with the fourth reference signal terminal, and a second electrode of the tenth transistor is electrically connected with the driving output terminal. A first electrode plate of the second capacitor is electrically connected with the first node, and a second electrode plate of the second capacitor is electrically connected with the driving output terminal.

In some examples, the first reference signal terminal and the fourth reference signal terminal are the same one signal terminal; or, the first reference signal terminal and the fourth reference signal terminal are signal terminals independent of each other, and a voltage of the first reference signal terminal is smaller than a voltage of the fourth reference signal terminal.

In some examples, the shift register unit further includes an eleventh transistor. A gate of the eleventh transistor is electrically connected with a second node, a first electrode of the eleventh transistor is electrically connected with a fifth reference signal terminal, and a second electrode of the eleventh transistor is electrically connected with the first node.

In some examples, the fifth reference signal terminal and the first reference signal terminal are the same one signal terminal; or, the fifth reference signal terminal and the first reference signal terminal are signal terminals independent of each other, and a voltage of the fifth reference signal terminal is smaller than a voltage of the first reference signal terminal.

In some examples, the node control circuit is further configured to adjust a level of a signal at a second node. The second node includes M second sub-nodes. The node control circuit includes M sub-control circuits. An m-th sub-control circuit among the M sub-control circuits corresponds to an m-th second sub-node among the M second sub-nodes. Here, M is an integer and M≥1, m is an integer and 1≤m≤M. The m-th sub-control circuit is configured to adjust a signal at the m-th second sub-node and a signal at the first node. The cascade output circuit is further configured to provide the signal from the second reference signal terminal to the cascade output terminal in response to signals at the M second sub-nodes. The driving output circuit is further configured to provide a signal from a fourth reference signal terminal to the cascade output terminal according to the signals at the M second sub-nodes.

In some examples, the m-th sub-control circuit corresponds to an m-th third reference signal terminal. The m-th sub-control circuit includes: an m-th thirteenth transistor, an m-th fourteenth transistor, an m-th fifteenth transistor, an m-th sixteenth transistor and an m-th seventeenth transistor. A gate and a first electrode of the m-th thirteenth transistor are both electrically connected with the m-th third reference signal terminal, and a second electrode of the m-th thirteenth transistor is electrically connected with a gate of the m-th fourteenth transistor. A first electrode of the m-th fourteenth transistor is electrically connected with the m-th third reference signal terminal, and a second electrode of the m-th fourteenth transistor is electrically connected with the m-th second sub-node. A gate of the m-th fifteenth transistor is electrically connected with the first node, a first electrode of the m-th fifteenth transistor is electrically connected with the second reference signal terminal, and a second electrode of the m-th fifteenth transistor is electrically connected with the m-th second sub-node. A gate of the m-th sixteenth transistor is electrically connected with the first node, a first electrode of the m-th sixteenth transistor is electrically connected with the second reference signal terminal, and a second electrode of the sixteenth transistor is electrically connected with a gate of a second transistor. A gate of the m-th seventeenth transistor is electrically connected with the m-th second sub-node, a first electrode of the m-th seventeenth transistor is electrically connected with the second reference signal terminal, and a second electrode of the m-th seventeenth transistor is electrically connected with the first node.

In some examples, the cascade output circuit includes: an eighteenth transistor and M nineteenth transistors. An m-th nineteenth transistor among the M nineteenth transistors corresponds to the m-th second sub-node. A gate of the eighteenth transistor is electrically connected with the first node, a first electrode of the eighteenth transistor is electrically connected with the clock signal terminal, and a second electrode of the eighteenth transistor is electrically connected with the cascade output terminal. A gate of the m-th nineteenth transistor is electrically connected with the m-th second sub-node, a first electrode of the m-th nineteenth transistor is electrically connected with the second reference signal terminal, and a second electrode of the m-th nineteenth transistor is electrically connected with the cascade output terminal.

In some examples, the driving output circuit includes: a twentieth transistor, a third capacitor, and M twenty-first transistors. An m-th twenty-first transistor among the M twenty-first transistors corresponds to the m-th second sub-node. A gate of the twentieth transistor is electrically connected with the first node, a first electrode of the twentieth transistor is electrically connected with the clock signal terminal, and a second electrode of the twentieth transistor is electrically connected with the driving output terminal. A first electrode of the third capacitor is electrically connected with the first node, and a second electrode of the third capacitor is electrically connected with the driving output terminal. A gate of the m-th twenty-first transistor is electrically connected with the m-th second sub-node, a first electrode of the m-th twenty-first transistor is electrically connected with the fourth reference signal terminal, and a second electrode of the m-th twenty-first transistor is electrically connected with the driving output terminal.

In some examples, the shift register unit further includes M twenty-second transistors. For an m-th twenty-second transistor among the M twenty-second transistors, a gate of the m-th twenty-second transistor is connected with the first input signal terminal, a first electrode of the m-th twenty-second transistor is electrically connected with the second reference signal terminal, and a second electrode of the m-th twenty-second transistor is electrically connected with the m-th second sub-node.

In some examples, the shift register unit further includes a twenty-third transistor. A gate of the twenty-third transistor is electrically connected with an initial reset signal terminal, a first electrode of the twenty-third transistor is electrically connected with the second reference signal terminal, and a second electrode of the twenty-third transistor is electrically connected with the first node.

In some examples, the shift register unit further includes: a cascade noise reduction unit configured to provide the signal from the second reference signal terminal to the reset signal terminal in response to a signal from the cascade output terminal.

In some examples, the cascade noise reduction unit includes a twelfth transistor. A gate of the twelfth transistor is electrically connected with the cascade output terminal, a first electrode of the twelfth transistor is electrically connected with the second reference signal terminal, and a second electrode of the twelfth transistor is electrically connected with the reset signal terminal.

A gate driving circuit provided in embodiments of the disclosure includes a plurality of the shift register units in cascade. When the first input signal terminal and the second input signal terminal are signal terminals independent of each other: in every M cascaded shift register units that are adjacent to one another, a first input signal terminal of an M-th shift register unit is electrically connected with a cascade output terminal of a first shift register unit, and a second input signal terminal of the M-th shift register unit is electrically connected with a driving output terminal of the first shift register unit; and in every (M+1) cascaded shift register units that are adjacent to one another, a reset signal terminal of a first shift register unit is electrically connected with a cascade output terminal of an (M+1)-th shift register unit; where M is an integer greater than 1. When the first input signal terminal and the second input signal terminal are the same one signal terminal: in every M cascaded shift register units that are adjacent to one another, a first input signal terminal of an M-th shift register unit is electrically connected with a cascade output terminal of a first shift register unit; and in every (M+1) cascaded shift register units that are adjacent to one another, a reset signal terminal of the first shift register unit is connected with a cascade output terminal of an (M+1)-th shift register unit.

In some examples, when the first input signal terminal and the second input signal terminal are signal terminals independent of each other, in every M cascaded shift register units that are adjacent to one another, a trace electrically connecting the first input signal terminal of the M-th shift register unit and the cascade output terminal of the first shift register unit has a first length; a trace electrically connecting the second input signal terminal of the M-th shift register unit and the driving output terminal of the first shift register unit has a second length. Here, a ratio of the first length to the second length is 1.0-1.5.

A display apparatus provided in embodiments of the disclosure includes a plurality of gate lines and the gate driving circuit. One of the gate lines is electrically connected with a driving output terminal of one of the shift register units in the gate driving circuit.

DETAILED DESCRIPTION

Figure 1:
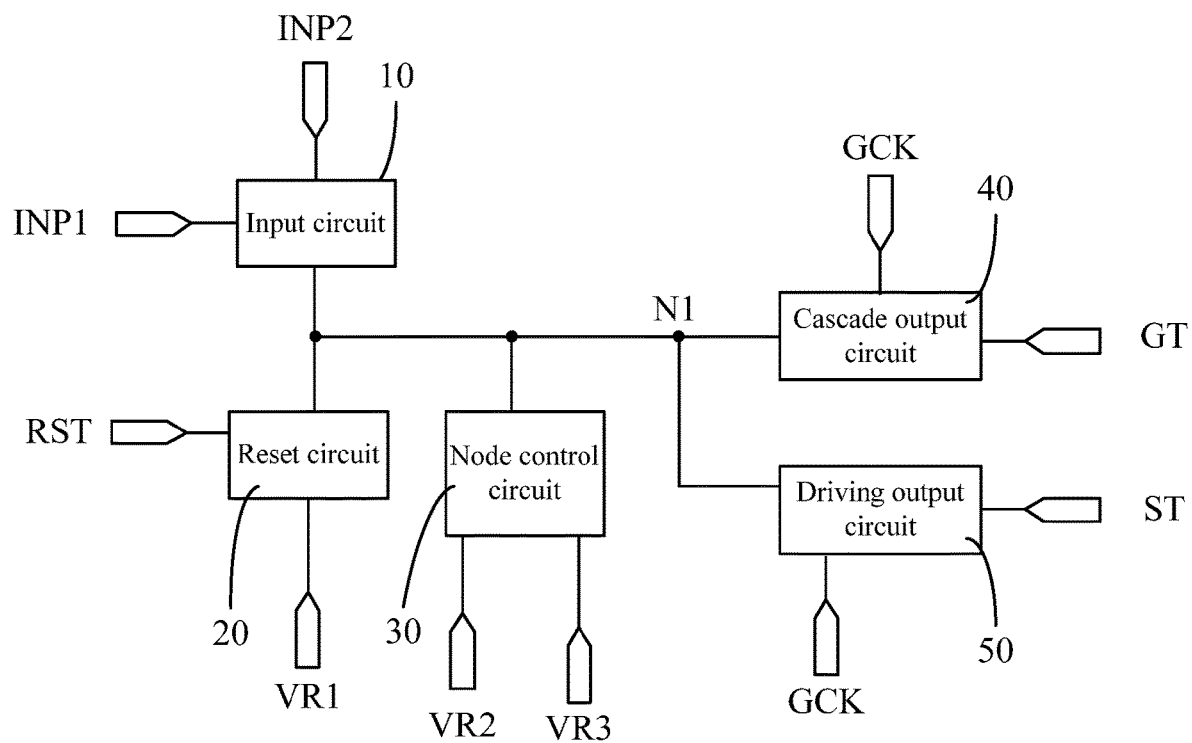
FIG. 1 is a schematic diagram of some structures of a shift register unit according to embodiments of the disclosure.

In order to make objectives, technical solutions and advantages of the embodiments of the disclosure clearer, the technical solutions of the embodiments of the disclosure are described clearly and completely below with reference to the drawings of the embodiments of the disclosure. Apparently, the described embodiments are some, not all, of the embodiments of the disclosure. The embodiments in the disclosure and the features in the embodiments may be combined with each other without conflict. Based on the described embodiments of the disclosure, all other embodiments obtained by those of ordinary skill in the art without inventive efforts fall within the protection scope of the disclosure.

Unless otherwise indicated, the technical or scientific terms used in the disclosure shall have the usual meanings understood by a person of ordinary skill in the art to which the disclosure belongs. The words "first", "second" and the like used in the disclosure do not indicate any order, quantity or importance, but are only used to distinguish different components. The word "including" or "containing" and the like, means that an element or item preceding the word covers an element or item listed after the word and the equivalent thereof, without excluding other elements or items. The word "connection" or "coupling" and the like is not restricted to physical or mechanical connection, but may include electrical connection, whether direct or indirect.

It should be noted that sizes and shapes of all figures in the drawings do not reflect a true scale and are only intended to illustrate the contents of the disclosure. Same or similar reference signs indicate same or similar elements or elements with the same or similar function throughout the disclosure.

As shown in FIG. 1, some shift register units provided by embodiments of the disclosure may include an input circuit 10, a reset circuit 20, a node control circuit 30, a cascade output circuit 40 and a driving output circuit 50. The input circuit 10 is configured to provide a signal from a second input signal terminal INP2 to a first node N1 in response to a signal from a first input signal terminal INP1. The reset circuit 20 is configured to provide a signal from the first reference signal terminal VR1 to the first node N1 in response to a signal from the reset signal terminal RST. The node control circuit 30 is configured to at least adjust a level of a signal from the first node according to a signal from a second reference signal terminal VR2 and a signal from a third reference signal terminal VR3. For example, the node control circuit 30 is configured to, according to the signal from the second reference signal terminal VR2 and the signal from the third reference signal terminal VR3, make the level of the signal at the first node N1 and a level of the signal at the second node to be opposite. The cascade output circuit 40 is configured to provide a signal from a clock signal terminal GCK to a cascade output terminal GT in response to the signal at the first node N1. The driving output circuit 50 is configured to provide the signal from the clock signal terminal GCK to a driving output terminal ST in response to the signal at the first node N1.

In the shift register unit provided by the embodiments of the disclosure, the input circuit provides the signal from the second input signal terminal to the first node in response to the signal from the first input signal terminal, the reset circuit provides the signal from the first reference signal terminal to the first node in response to the signal from the reset signal terminal, the node control circuit at least adjusts the level of the signal at the first node according to the signals from the second reference signal terminal and the third reference signal terminal, the cascade output circuit provides the signal from the clock signal terminal to the cascade output terminal in response to the signal at the first node, and the driving output circuit provides the signal from the clock signal terminal to the driving output terminal in response to the signal at the first node. In this way, the load capacity of the driving output terminal can be improved.

Figure 2:
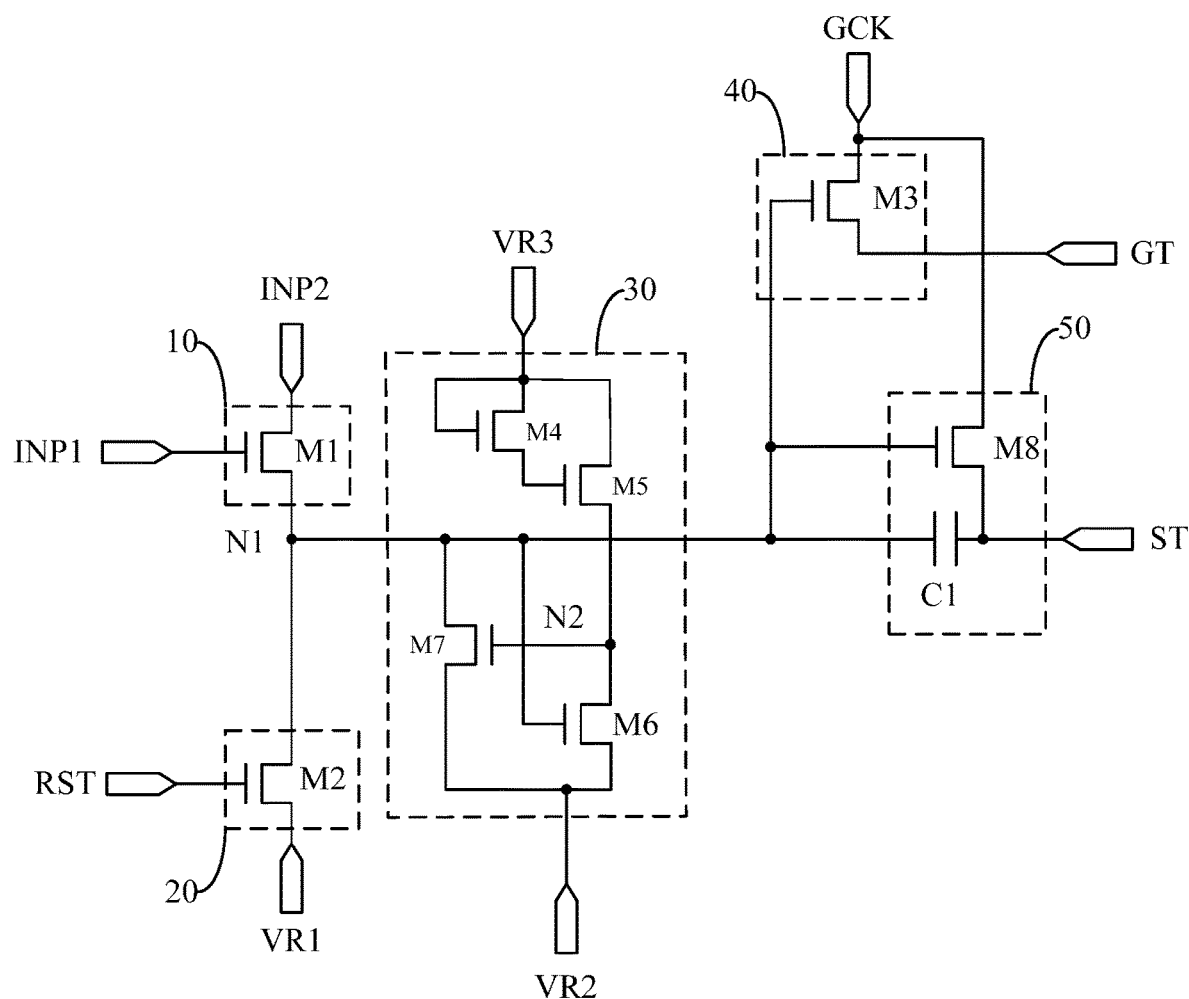
FIG. 2 is a schematic diagram of some specific structures of a shift register unit according to embodiments of the disclosure.

During specific implementation, in the embodiment of the disclosure, as shown in FIG. 2, the input circuit 10 may include: a first transistor M1. Here, a gate of the first transistor M1 is electrically connected with the first input signal terminal INP1, a first electrode of the first transistor M1 is electrically connected with the second input signal terminal INP2, and a second electrode of the first transistor M1 is electrically connected with the first node N1.

Figure 3:
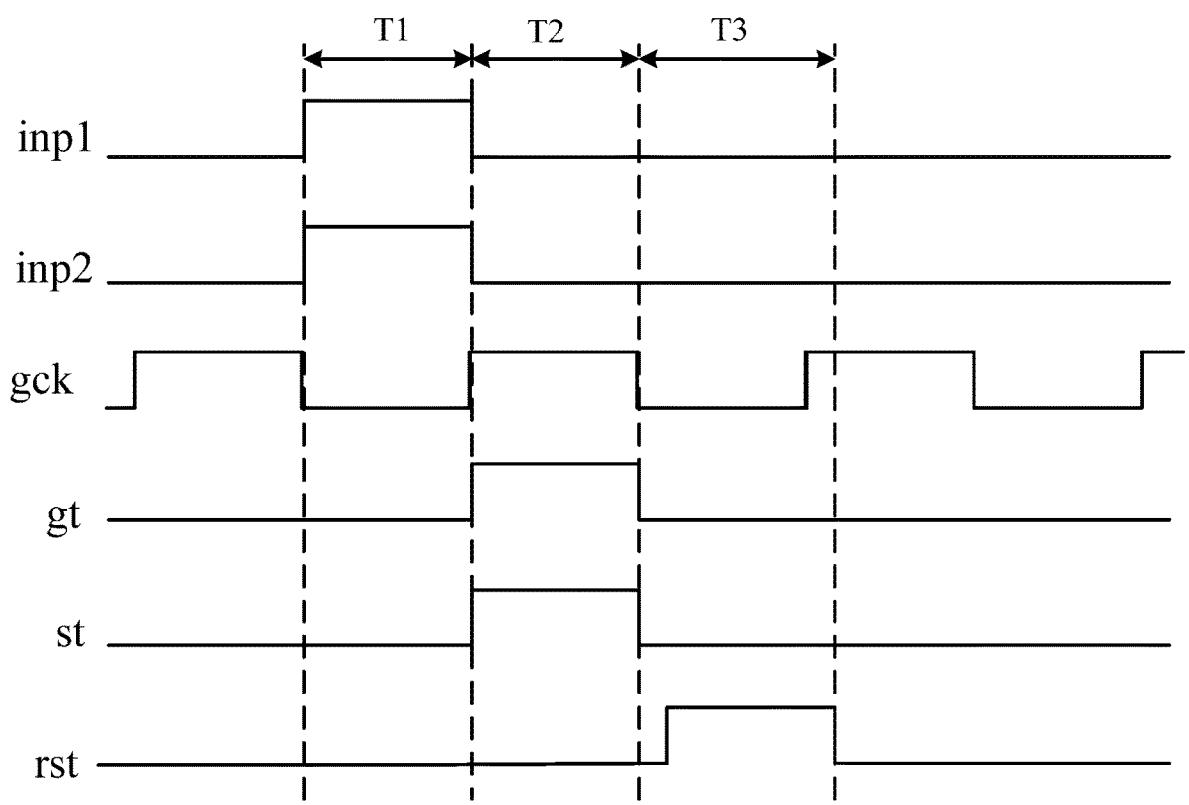
FIG. 3 is a timing chart for some signals according to embodiments of the disclosure.

During specific implementation, in the embodiment of the disclosure, as shown in FIG. 2, the first input signal terminal INP1 and the second input signal terminal INP2 can be mutually independent signal terminals. That is, the first input signal terminal INP1 and the second input signal terminal INP2 are not electrically connected with the one same port or the same one signal line. For example, as shown in FIG. 3, the timing of the signal input into the first input signal terminal INP1 and the timing of the signal input into the second input signal terminal INP2 can be the same. For example, when the signal input into the first input signal terminal INP1 is a signal of high level, the signal input into the second input signal terminal INP2 is a signal of high level. When the signal input into the first input signal terminal INP1 is a signal of low level, the signal input into the second input signal terminal INP2 is also a signal of low level.

During specific implementation, in the embodiment of the disclosure, as shown in FIG. 2, the reset circuit 20 may include a second transistor M2. Here, a gate of the second transistor M2 is electrically connected with the reset signal terminal RST, and a first electrode of the second transistor M2 is electrically connected with the first reference signal terminal VR1, and a second electrode of the second transistor M2 is electrically connected with the first node N1.

During specific implementation, in the embodiment of the disclosure, as shown in FIG. 2, the cascade output circuit 40 may include a third transistor M3. Here, a gate of the third transistor M3 is electrically connected with the first node N1, a first electrode of the third transistor M3 is electrically connected with the clock signal terminal GCK, and a second electrode of the third transistor M3 is electrically connected with the cascade output terminal GT.

During specific implementation, in the embodiment of the disclosure, as shown in FIG. 2, the node control circuit 30 may include: a fourth transistor M4, a fifth transistor M5, a sixth transistor M6, and a seventh transistor M7. Here, a gate and a first electrode of the fourth transistor M4 are both electrically connected with the third reference signal terminal VR3, and a second electrode of the fourth transistor M4 is electrically connected with a gate of the fifth transistor M5. A first electrode of the fifth transistor M5 is electrically connected with the third reference signal terminal VR3, and a second electrode of the fifth transistor M5 is electrically connected with the second node N2. A gate of the sixth transistor M6 is electrically connected with the first node N1, a first electrode of the sixth transistor M6 is electrically connected with the second reference signal terminal VR2, and a second electrode of the sixth transistor M6 is electrically connected with the second node N2. A gate of the seventh transistor M7 is electrically connected with the second node N2, a first electrode of the seventh transistor M7 is electrically connected with the second reference signal terminal VR2, and a second electrode of the seventh transistor M7 is electrically connected with the first node N1.

During specific implementation, in the embodiment of the disclosure, as shown in FIG. 2, the driving output circuit 50 may include: an eighth transistor M8 and a first capacitor C1. Here, a gate of the eighth transistor M8 is electrically connected with the first node N1. A first electrode of the eighth transistor M8 is electrically connected with the clock signal terminal GCK, and a second electrode of the eighth transistor M8 is electrically connected with the driving output terminal ST. A first electrode plate of the first capacitor C1 is electrically connected with the first node N1, and a second electrode plate of the first capacitor C1 is electrically connected with the driving output terminal ST.

During specific implementation, according to a direction of signal flow, the first electrode of the above-mentioned transistor(s) can be used as its source, and the second electrode can be used as its drain; or, the first electrode can be used as its drain, and the second electrode can be used as its source, which is not distinguished specifically.

It should be noted that the transistors mentioned in the above embodiments of the disclosure may be TFTs or metal oxide semiconductor field effect transistors (Metal Oxide Semiconductor, MOS), which are not limited here.

In order to simplify the preparation process, during specific implementation, in the embodiment of the disclosure, as shown in FIG. 2, all transistors may be N-type transistors. Moreover, the signal from the first reference signal terminal VR1 is a signal of low level, the signal from the second reference signal terminal VR2 is a signal of low level, and the signal from the third reference signal terminal VR3 is a signal of high level. For example, the first reference signal terminal VR1 and the second reference signal terminal VR2 may be signal terminals independent of each other, and a voltage vr2 of the second reference signal terminal VR2 may be smaller than a voltage vr1 of the first reference signal terminal VR1.

For example, the signal at the clock signal terminal GCK may be a clock signal that alternates between a high level and a low level. The voltage vc1 of the low level of the clock signal may be the same as the voltage vr2 of the second reference signal terminal VR2.

Of course, in the embodiment of the disclosure, the transistors are N-type transistors as an example for illustration. For the case where the transistors are P-type transistors, the design principle is the same as that of the disclosure, which also falls within the scope of protection of the disclosure.

During specific implementation, the P-type transistor is turned off under the control of a signal of high level and turned on under the control of a signal of low level. The N-type transistor is turned on under the control of a signal of high level and turned off under the control of a signal of low level.

The above are only examples to illustrate the specific structure of the shift register unit provided by the embodiments of the disclosure. During specific implementation, the specific structures of the above-mentioned circuits are not limited to the above-mentioned structures provided by the embodiments of the disclosure, and may be other structures known to those skilled in the art, which are not limited here.

The following describes the working process of the above-mentioned shift register unit provided by the embodiment of the disclosure by taking the shift register unit shown in FIG. 2 as an example and combining the signal timing chart shown in FIG. 3. For example, a stage T1, a stage T2, and a stage T3 in the signal timing chart shown in FIG. 3, i.e., a total of three stages are selected. It should be noted that the signal timing chart shown in FIG. 3 illustrates only a working process of a certain shift register unit during one display frame. The working process of the shift register unit during other display frames is basically the same as the working process during this display frame, which will not be repeated here.

As shown in FIG. 3, "inp1" represents the signal from the first input signal terminal INP1, "inp2" represents the signal from the second input signal terminal INP2, "gck" represents the signal from the clock signal terminal GCK, "gt" represents the signal from the cascade output terminal GT, "st" represents the signal from the driving output terminal ST, and "rst" represents the signal from the reset signal terminal RST.

In the stage T1, the signal "inp1" is a signal of high level to control the first transistor M1 to be turned on, so as to provide the signal "inp2" of high level to the first node N1 to cause that the signal at the first node N1 is a signal of high level, thereby controlling the sixth transistor M6, the third transistor M3 and the eighth transistor M8 to be turned on and to charge the first capacitor C1. The signal of low level from the second reference signal terminal VR2 is provided to the second node N2 via the turned-on sixth transistor M6, so that the signal at the second node N2 is a signal of low level, thereby controlling the seventh transistor M7 to be turned off. The signal "gck" of low level is provided to the cascade output terminal GT via the turned-on third transistor M3, so that the signal "gt" output from the cascade output terminal GT is a signal of low level. The signal "gck" of low level is provided to the driving output terminal ST via the turned-on eighth transistor M8, so that the signal "st" output from the driving output terminal ST is a signal of low level. Moreover, the signal "rst" is a signal of low level, which can control the second transistor M2 to be turned off.

In the stage T2, the signal "inp1" is a signal of low level, which can control the first transistor M1 to be turned off; and the signal "rst" is a signal of low level, which can control the second transistor M2 to be turned off. Due to the first capacitor C1, the signal at the first node N1 can remain at the high level, thereby controlling the sixth transistor M6, the third transistor M3 and the eighth transistor M8 to be turned on. The signal of low level from the second reference signal terminal VR2 is provided to the second node N2 via the turned-on sixth transistor M6, so that the signal at the second node N2 is a signal of low level, thereby controlling the seventh transistor M7 to be turned off. The signal "gck" of high level is provided to the cascade output terminal GT via the turned-on third transistor M3, so that the signal "gt" output from the cascade output terminal GT is a signal of high level. The signal "gck" of high level is provided to the driving output terminal ST via the turned-on eighth transistor M8, so that the signal "st" output from the driving output terminal ST is a signal of high level. Since the driving output terminal ST outputs a signal of high level, the high level of the first node N1 is pulled up by the first capacitor C1 in order to maintain the voltage difference between the two ends of the first capacitor C1, so that the third transistor M3 and the eighth transistor M8 can be turned on fully. In this way, the signal "gck" of high level can be provided to the cascade output terminal GT via the third transistor M3 without voltage loss as much as possible, so that the signal "gt" output from the cascade output terminal GT can be kept stable in voltage as much as possible. Further, the signal "gck" of high level is provided to the driving output terminal ST via the eighth transistor M8 without voltage loss as much as possible, so that the signal "st" output from the driving output terminal ST in can be kept stable in voltage as much as possible.

In the stage T3, the signal "inp1" is a signal of low level, which can control the first transistor M1 to be turned off; and the signal "rst" is a signal of low level, which can control the second transistor M2 to be turned off. Due to the first capacitor C1, the signal at the first node N1 can remain at the high level, so that the sixth transistor M6, the third transistor M3 and the eighth transistor M8 can be controlled to be turned on. The signal of low level from the second reference signal terminal VR2 can be provided to the second node N2 via the turned-on sixth transistor M6, so that the signal at the second node N2 is a signal of low level, thereby controlling the seventh transistor M7 to be turned off. The signal "gck" of low level can be provided to the cascade output terminal GT via the turned-on third transistor M3, so that the signal "gt" output from the cascade output terminal GT is a signal of low level. The signal "gck" of low level can be provided to the driving output terminal ST via the turned-on eighth transistor M8, so that the signal "st" output from the driving output terminal ST is a signal of low level.

After that, the signal "inp1" is a signal of low level, which can control the first transistor M1 to be turned off. Moreover, the signal "rst" is a signal of high level to control the second transistor M2 to be turned on, so as to provide the signal of low level from the first reference signal terminal VR1 to the first node N1, so that the signal at the first node N1 is a signal of low level, thereby controlling the sixth transistor M6, the third transistor M3, and the eighth transistor M8 to be turned off. Due to the fourth transistor M4, the signal of high level from the third reference signal terminal VR3 can be provided to the second node N2 via the turned-on fifth transistor M5, so that the signal at the second node N2 is a signal of high level, thereby controlling the seventh transistor M7 to be turned on. Thus, the signal from the second reference signal terminal VR2 is provided to the first node N1, further ensuring that the signal at the first node N1 is a signal of low level. The signal "gt" output from the cascade output terminal GT remains at the low level, and the signal "st" output from the driving output terminal ST remains at the low level.

As can be seen from the above embodiments, in the embodiment of the disclosure, the signal "st" input into the gate line is controlled to be output by the eighth transistor M8, and the signal "gt" for cascading the shift register units is controlled to be output by the third transistor M3. In practice, a size of the eighth transistor M8 can be made much larger than a size of the third transistor M3, so that the load capacity of the signal "st" can be much greater than the load capacity of the signal "gt", thereby improving the stability of the signal "st". For example, a ratio SM8/SM3 of the size SM8 of the eighth transistor M8 to the size SM3 of the third transistor M3 ranges from 5 to 16. For example, the ratio SM8/SM3 can be set as 5, 7, 10, 12 or 16, which is not limited here.

Moreover, since signals of the gate and the first electrode of the first transistor M1 are separated from each other, the first input signal terminal connected with the gate of the first transistor M1 can be connected with the cascade output terminal GT of the shift register unit in the cascade, and the second input signal terminal can be connected with the driving output terminal ST of the shift register unit in the cascade. Since the size of the eighth transistor M8 is made much larger than the size of the third transistor M3, the load capacity of the signal "st" can be made much greater than the load capacity of the signal "gt". In this way, in the stage T1, when the first transistor M1 is turned on, the signal "st" of high level is input into the first node N1, which can greatly improve the pulling capability of the first node N1. In the stage T3, when the first transistor M1 is turned off, the voltage at the first node N1 is the voltage vr1 of the first reference signal terminal VR1, and the gate voltage of the first transistor M1 is the voltage of the signal of low level from the first input signal terminal, that is, the gate voltage of the first transistor M1 is the voltage vc1 of the signal of low level from the clock signal terminal GCK. Since, vc1=vr2, and vr2<vr1, then vc1<vr1. At this time, the gate-source voltage Vgs1 of the first transistor M1 is (vc1−vr1), that is, Vgs1<0, which can make the leakage current of the first transistor M1 relatively low, thereby reducing leakage effect of the path crossing the first transistor M1 from the first node N1.

Moreover, the reset signal terminal RST connected with the gate of the second transistor M2 can be connected with the cascade output terminal GT of the shift register unit in the cascade, and the first electrode of the second transistor M2 can be connected with the first reference signal terminal VR1. Since the size of the eighth transistor M8 is made much larger than the size of the third transistor M3, the load capacity of the signal "st" can be made much greater than the load capacity of the signal "gt". In this way, during the stages T1 and T2, when the second transistor M2 is turned off, the gate voltage of the second transistor M2 is the voltage of the signal of low level from the reset signal terminal RST, that is, the gate voltage of the second transistor M2 is the voltage vc1 of the signal of low level from the clock signal terminal GCK. Since, vc1=vr2, and vr2<vr1, then vc1 is smaller than vr1. At this time, the gate-source voltage Vgs2 of the second transistor M2 is (vc1−vr1), that is, Vgs2<0, which can make the leakage current of the second transistor M2 relatively low, thereby reducing leakage effect of the path crossing the second transistor M2 from the first node N1. For example, the range of (vc1−vr1) is from −3 to −1. For example, (vc1−vr1) can be set as −3, −2, or −1, which is not limited here.

Figure 4A:
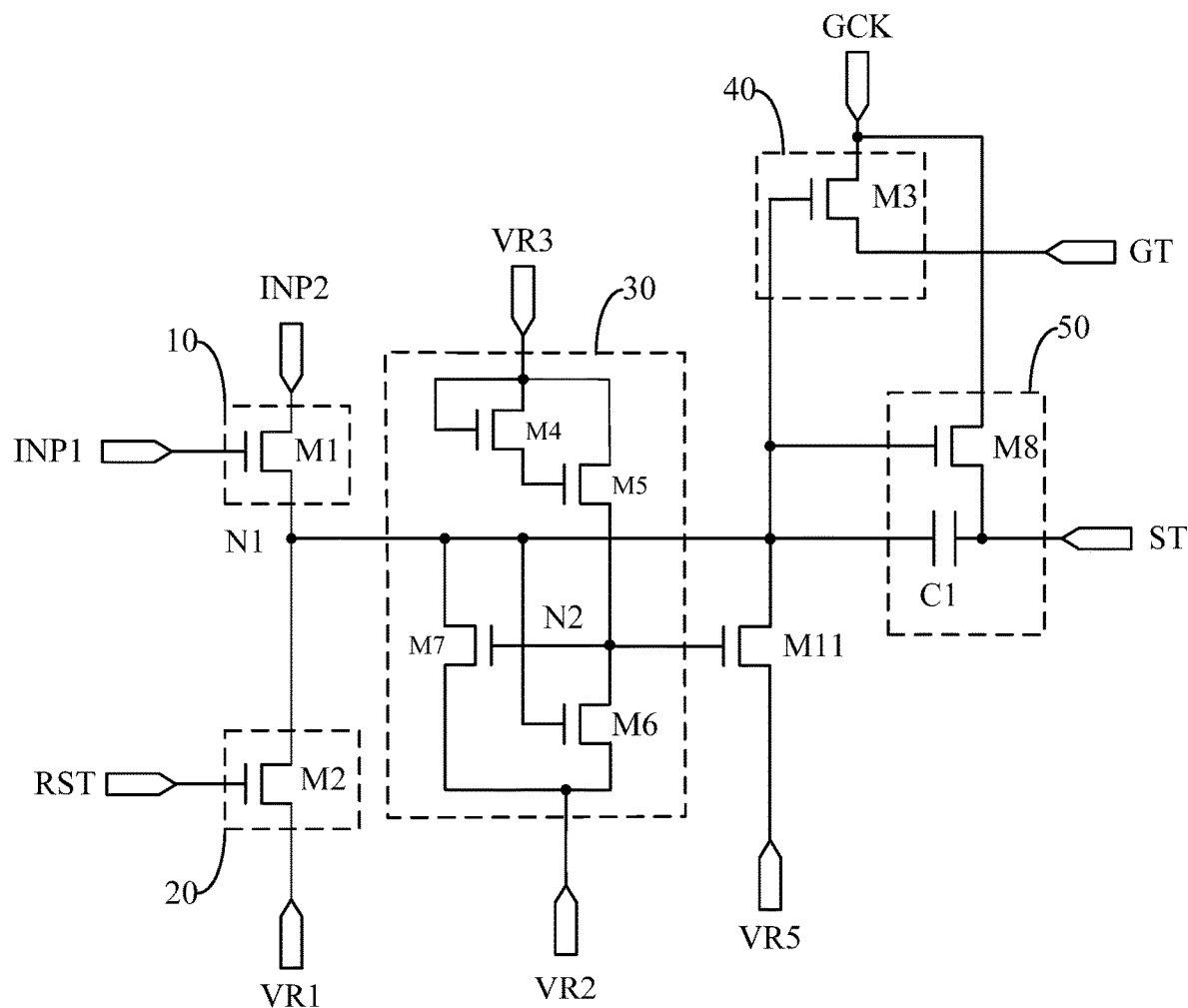
FIG. 4A is a schematic diagram of some other specific structures of a shift register unit according to embodiments of the disclosure.
Figure 4B:
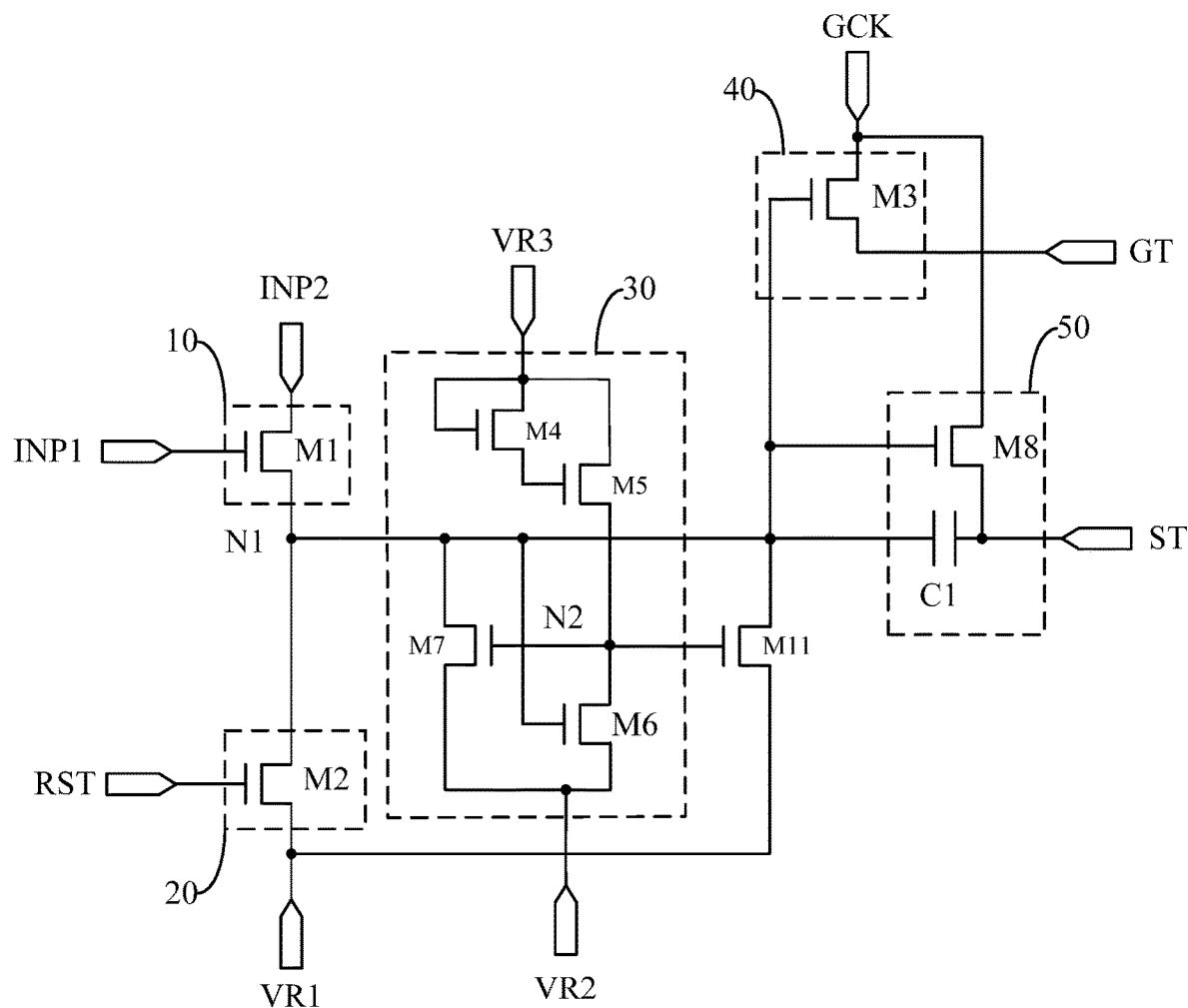
FIG. 4B is a schematic diagram of some other specific structures of a shift register unit according to embodiments of the disclosure.

Referring to FIG. 4A and FIG. 4B, schematic structural diagrams of other shift register units according to embodiments of the disclosure are shown, which are modified from the implementation in the above embodiments. Only the differences between this embodiment and the above-mentioned embodiment will be described below, and the similarities will not be repeated.

Exemplarily, as shown in FIG. 4A, the shift register unit in the embodiment of the disclosure may further include: an eleventh transistor M11. Here, a gate of the eleventh transistor M11 is electrically connected with the second node N2, and a first electrode of the eleventh transistor M11 is electrically connected with a fifth reference signal terminal VR5, and a second electrode of the eleventh transistor M11 is electrically connected with the first node N1.

In the embodiment of the disclosure, the fifth reference signal terminal VR5 and the first reference signal terminal VR1 can be the same one signal terminal. For example, as shown in FIG. 4B, the first electrode of the eleventh transistor M11 is electrically connected with the first reference signal terminal VR1.

In the embodiment of the disclosure, the voltage vr2 of the second reference signal terminal VR2 can be made smaller than the voltage vr1 of the first reference signal terminal VR1.

For example, a signal timing chart corresponding to the shift register unit shown in FIG. 4A and FIG. 4B may be as shown in FIG. 3. In the stages T1 and T2, the eleventh transistor M11 is in an off state under the control of the signal of low level at the second node N2. In the stage T3, the eleventh transistor M11 is in an on state under the control of the signal of high level at the second node N2, and the signal from the fifth reference signal terminal VR5 can be provided to the first node N1, which makes the signal at the first node N1 to be further stabilized as a signal of low level, thereby improving the signal stability of the first node N1. Moreover, in each stage, the working process of the remaining transistors can be basically the same as the working process in the above embodiments, and will not be described again here.

As can be seen from the above embodiments, in the embodiment of the disclosure, the signal "st" input into the gate line is controlled to be output by the eighth transistor M8, and the signal "gt" for cascading the shift register units is controlled to be output by the third transistor M3. In practice, the size of the eighth transistor M8 can be made much larger than the size of the third transistor M3, so that the load capacity of the signal "st" can be much greater than the load capacity of the signal "gt", thus improving the stability of the signal "st".

Moreover, since signals of the gate and the first electrode of the first transistor M1 are separated from each other, the first input signal terminal connected with the gate of the first transistor M1 can be connected with the cascade output terminal GT of the shift register unit in the cascade, and the second input signal terminal can be connected with the driving output terminal ST of the shift register unit in the cascade. Since the size of the eighth transistor M8 is made much larger than the size of the third transistor M3, the load capacity of the signal "st" can be made much greater than the load capacity of the signal "gt". In this way, in the stage T1, when the first transistor M1 is turned on, the signal "st" of high level is input into the first node N1, which can greatly improve the pulling capability of the first node N1. In the stage T3, when the first transistor M1 is turned off, the voltage at the first node N1 is the voltage vr1 of the first reference signal terminal VR1, and the gate voltage of the first transistor M1 is the voltage of the signal of low level from the first input signal terminal, that is, the gate voltage of the first transistor M1 is the voltage vc1 of the signal of low level from the clock signal terminal GCK. The source voltage of the first transistor M1 is the voltage vr1 of the first node N1. Since, vc1=vr2, and vr2<vr1, then vc1<vr1. At this time, the gate-source voltage Vgs1 of the first transistor M1 is (vc1−vr1), that is, Vgs1<0, which can make the leakage current of the first transistor M1 relatively low, thereby reducing leakage effect of the path crossing the first transistor M1 from the first node N1.

Moreover, the reset signal terminal RST connected with the gate of the second transistor M2 can be connected with the cascade output terminal GT of the shift register unit in the cascade, and the first electrode of the second transistor M2 can be connected with the first reference signal terminal VR1. Since the size of the eighth transistor M8 is made much larger than the size of the third transistor M3, the load capacity of the signal "st" can be made much greater than the load capacity of the signal "gt". In this way, during the stages T1 and T2, when the second transistor M2 is turned off, the voltage of the gate of the second transistor M2 is the voltage of the signal of low level from the reset signal terminal RST, that is, the gate voltage of the second transistor M2 is the voltage vc1 of the signal of low level from the clock signal terminal GCK. The source voltage of the second transistor M2 is vr1. Since, vc1=vr2, and vr2<vr1, then vc1 is smaller than vr1. At this time, the gate-source voltage Vgs2 of the second transistor M2 is equal to (vc1−vr1), that is, Vgs2<0, which can make the leakage current of the second transistor M2 relatively low, thereby reducing the leakage effect of path crossing the second transistor M2 from the first node N1.

Figure 5:
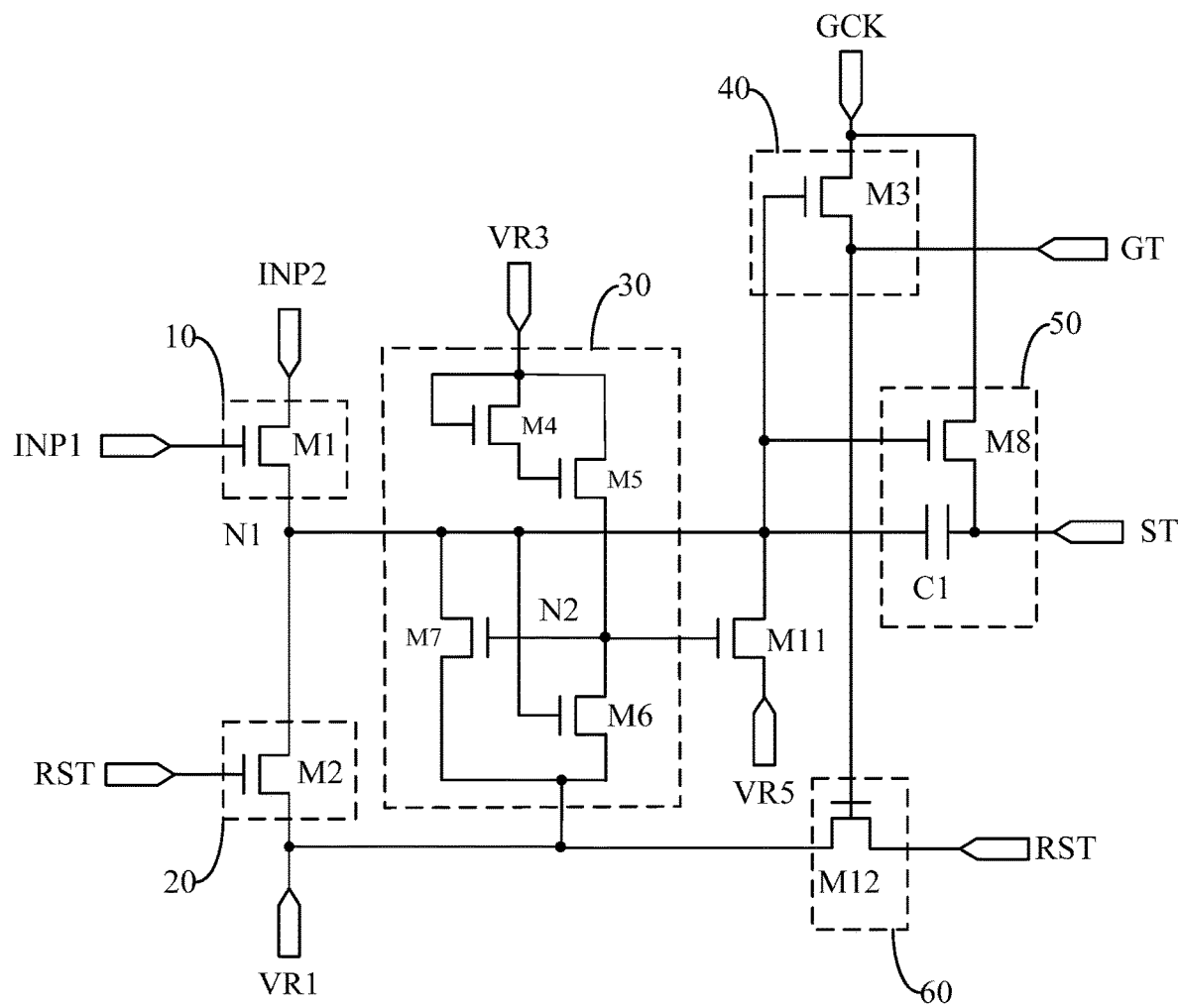
FIG. 5 is a schematic diagram of some other specific structures of a shift register unit according to embodiments of the disclosure.

Embodiments of the disclosure further provide some shift register units, whose schematic structural diagrams are as shown in FIG. 5, which are modified from the implementation in the above embodiments. Only the differences between this embodiment and the above-mentioned embodiment will be described below, and the similarities will not be repeated.

In the embodiment of the disclosure, as shown in FIG. 5, the shift register unit may further include: a cascade noise reduction unit 60. Here, the cascade noise reduction unit 60 is configured to provide the signal from the second reference signal terminal VR2 to the reset signal terminal RST in response to the signal from the cascade output terminal GT.

In the embodiment of the disclosure, as shown in FIG. 5, the cascade noise reduction unit 60 may include: a twelfth transistor M12. Here, the gate of the twelfth transistor M12 is electrically connected with the cascade output terminal GT, a first electrode of the twelfth transistor M12 is electrically connected with the second reference signal terminal VR2, and a second electrode of the twelfth transistor M12 is electrically connected with the reset signal terminal RST.

In the embodiment of the disclosure, the second reference signal terminal VR2 and the first reference signal terminal VR1 can be the same one signal terminal. For example, as shown in FIG. 5, the first electrode of the sixth transistor M6, the first electrode of the seventh transistor M7, and the first electrode of the second transistor M2 are all electrically connected with the first reference signal terminal VR1.

For example, the signal at the clock signal terminal GCK may be a clock signal a clock signal that alternates between a high level and a low level. The voltage vc1 of the signal of low level in the clock signal may be the same as the voltage vr2 of the second reference signal terminal VR2 and the voltage vr1 of the first reference signal terminal VR1.

For example, the fifth reference signal terminal VR5 and the first reference signal terminal VR1 can be independent of each other, and the voltage of the fifth reference signal terminal VR5 is smaller than the voltage of the first reference signal terminal VR1, or the fifth reference signal The voltage of the terminal VR5 is greater than the voltage of the first reference signal terminal VR1.

For example, the first input signal terminal INP1 and the second input signal terminal INP2 can be independent of each other. That is, the first input signal terminal INP1 and the second input signal terminal INP2 are not electrically connected with the same one port or the same one signal line. For example, as shown in FIG. 3, the timing of the signal input into the first input signal terminal INP1 and the timing of the signal input into the second input signal terminal INP2 can be the same. For example, when the signal input into the first input signal terminal INP1 is a signal of high level, the signal input into the second input signal terminal INP2 is also a signal of high level. When the signal input into the first input signal terminal INP1 is a signal of low level, the signal input into the second input signal terminal INP2 is also a signal of low level.

For example, the signal timing chart corresponding to the shift register unit shown in FIG. 5 may be as shown in FIG. 3. Here, in the stages T1 and T3, the twelfth transistor M12 is controlled to be in an off state by the signal of low level from the cascade output terminal GT. In the stage T2, the twelfth transistor M12 is controlled to be in an on state by the signal of high level from the cascade output terminal GT, and the signal from the second reference signal terminal VR2 can be provided to the reset signal terminal RST, thereby causing the reset signal terminal RST to be input with a signal of low level to control the second transistor M2 to further be in an off state. Moreover, in each stage, the working process of the remaining transistors can be basically the same as the working process in the above embodiment, and will not be repeated here.

It can be seen from the above embodiments that in the embodiments of the disclosure, a signal is provided to the gate of the second transistor M2 through the twelfth transistor M12, so that the leakage current of the second transistor M2 can be reduced, thereby reducing the leakage of the first node and improving voltage stability of the first node.

Figure 6:
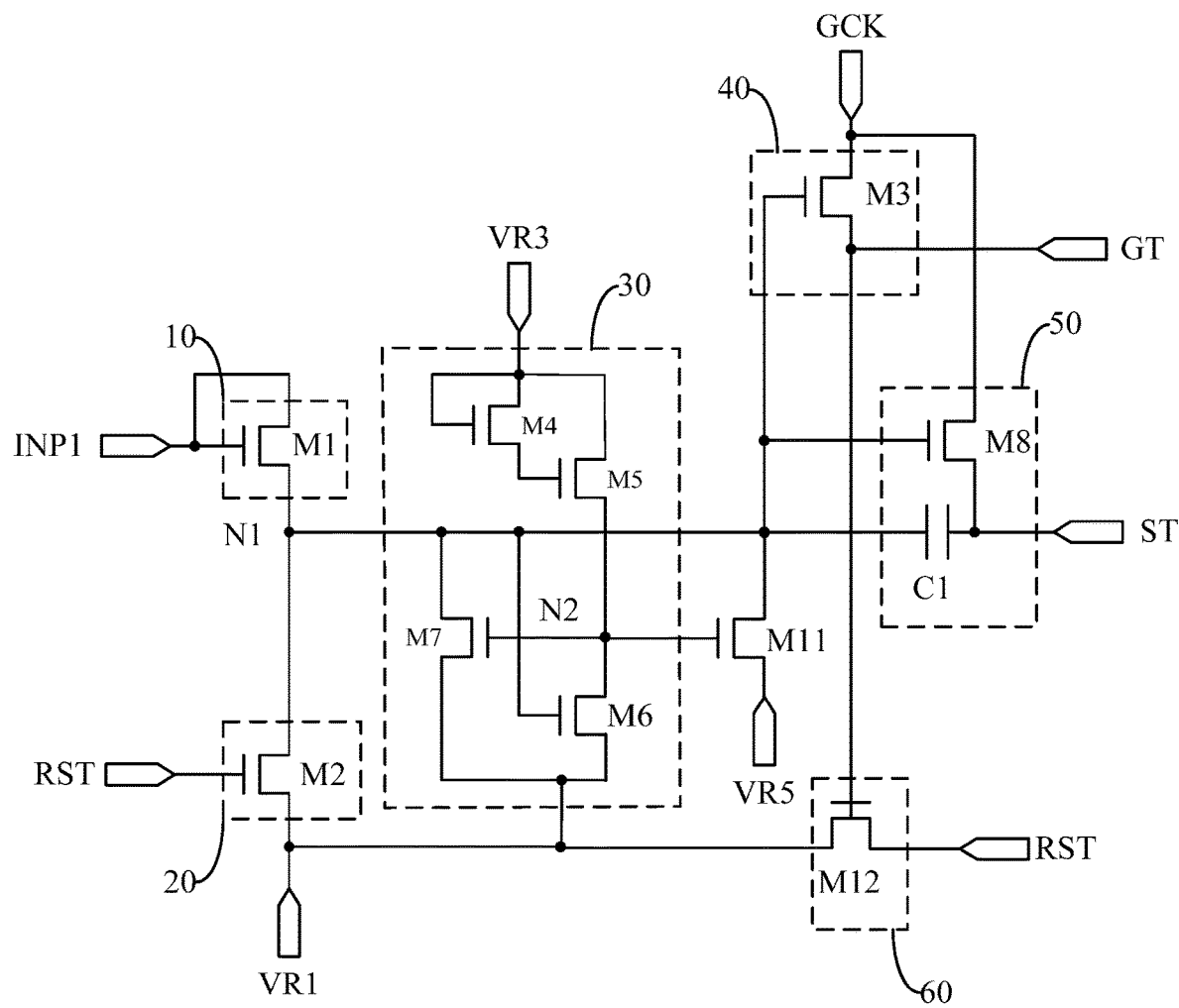
FIG. 6 is a schematic diagram of some other specific structures of a shift register unit according to embodiments of the disclosure.

Embodiments of the disclosure further provide some shift register units, whose schematic structural diagrams are as shown in FIG. 6, which are modified from the implementation in the above embodiments. Only the differences between this embodiment and the above-mentioned embodiment will be described below, and the similarities will not be repeated.

For example, the first input signal terminal INP1 and the second input signal terminal INP2 can be the same one signal terminal. For example, as shown in FIG. 6, the gate and the first electrode of the first transistor M1 are both electrically connected with the first input signal terminal INP1.

Figure 7:
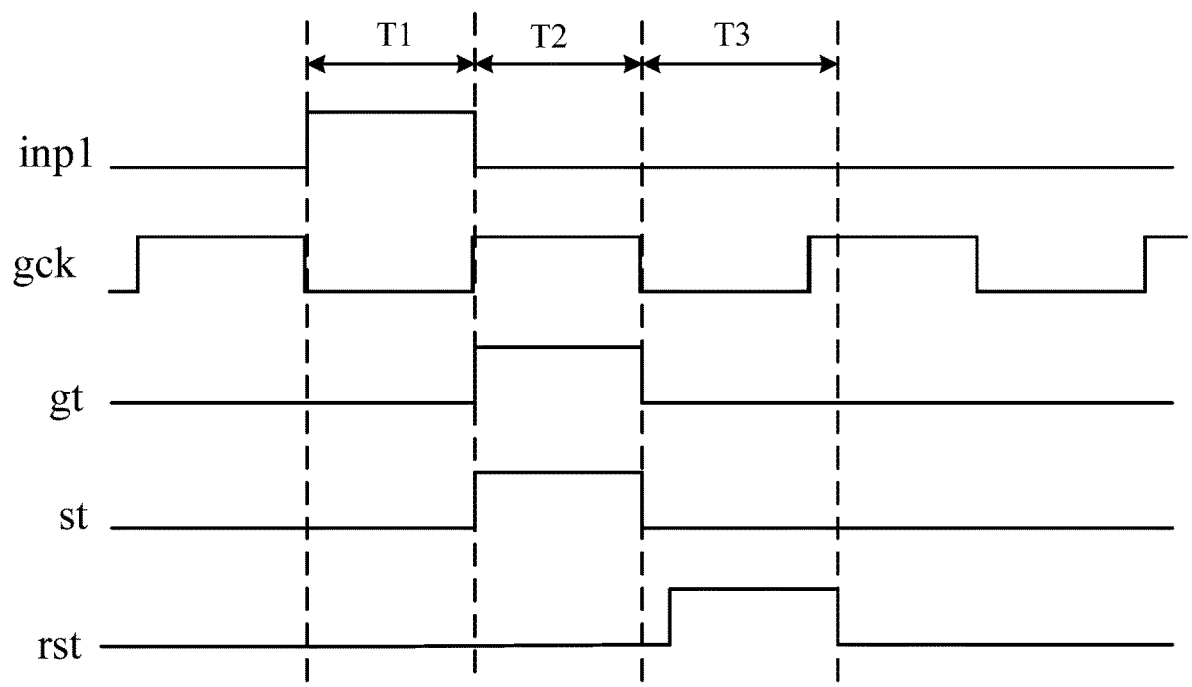
FIG. 7 is a timing chart for some other signals according to embodiments of the disclosure.

For example, the signal timing diagram corresponding to the shift register unit shown in FIG. 6 may be as shown in FIG. 7. Here, in the stage T1, the first transistor M1 is turned on and the signal "inp1" of high level is provided to the first node N1. Moreover, the twelfth transistor M12 is controlled to be in an off state by the signal of low level from the cascade output terminal GT. In the stage T2, the first transistor M1 is turned off. Moreover, the twelfth transistor M12 is controlled to be in an on state by the signal of high level from the cascade output terminal GT, and the signal from the second reference signal terminal VR2 can be provided to the reset signal terminal RST, thereby causing the reset signal terminal RST to be input with the signal of low level to control the second transistor M2 to further be in the off state. In stage T3, the first transistor M1 is turned off. Moreover, the twelfth transistor M12 is controlled to be in an off state by the signal of low level from the cascade output terminal GT. In addition, in each stage, the working process of the remaining transistors can be basically the same as the working process in the above embodiment, and will not be repeated here.

Figure 8A:
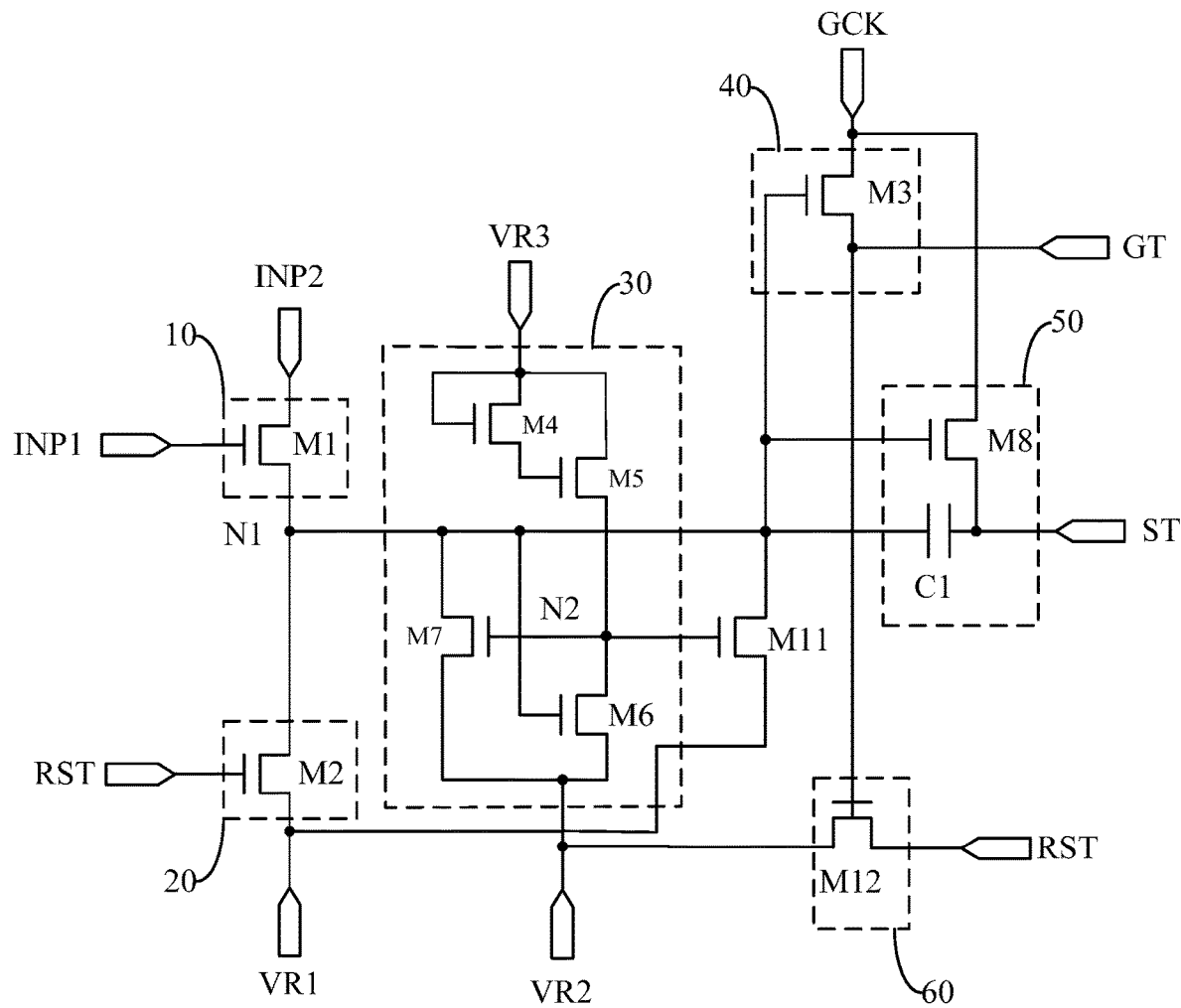
FIG. 8A is a schematic diagram of some other specific structures of a shift register unit according to embodiments of the disclosure.
Figure 8B:
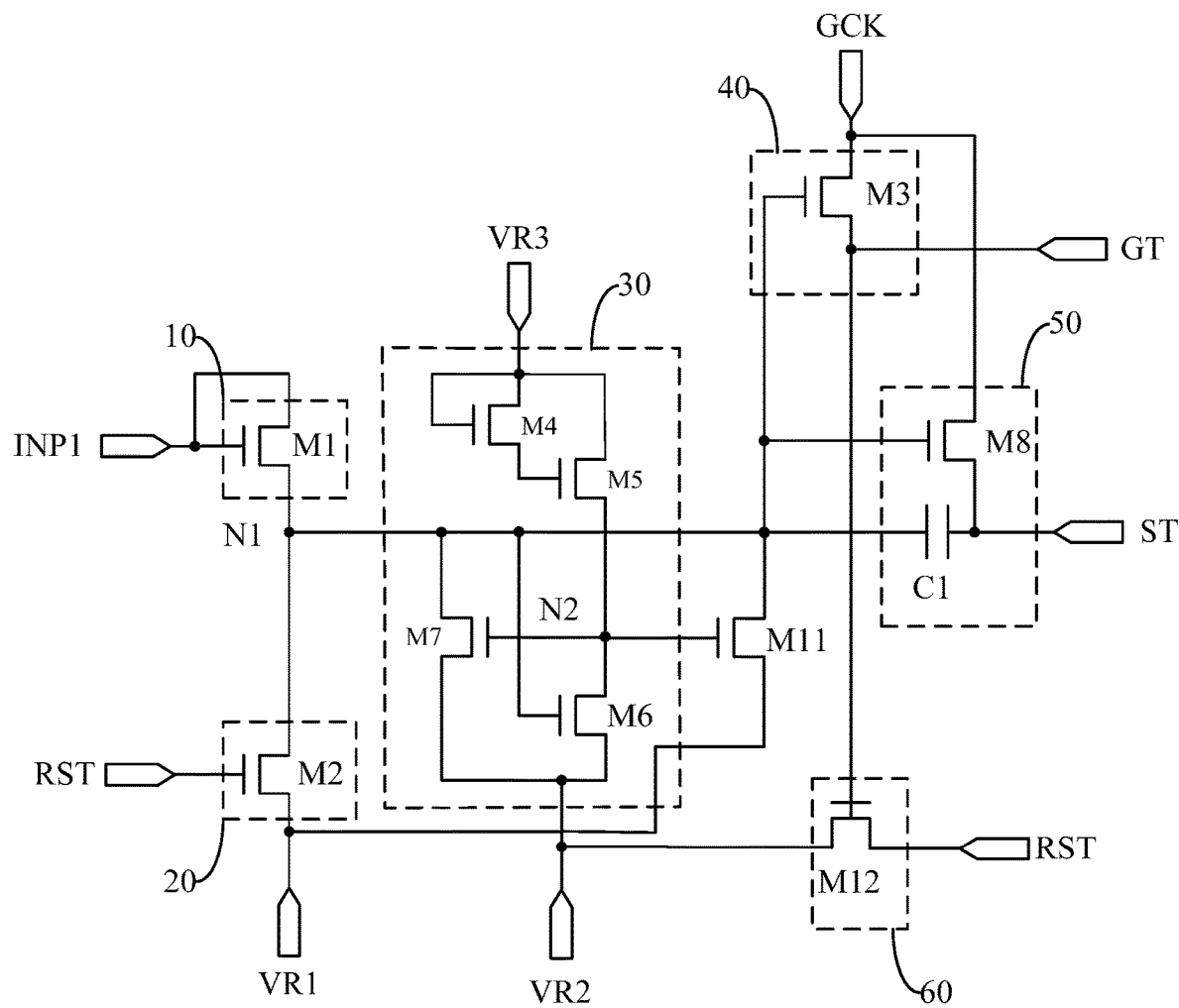
FIG. 8B is a schematic diagram of some other specific structures of a shift register unit according to embodiments of the disclosure.

Embodiments of the disclosure further provide some shift register units, whose schematic structural diagrams are as shown in FIGS. 8A and 8B, which are modified from the implementation in the above embodiments. Only the differences between this embodiment and the above-mentioned embodiment will be described below, and the similarities will not be repeated.

In the embodiment of the disclosure, the first input signal terminal INP1 and the second input signal terminal INP2 can be signal terminals independent of each other. For example, as shown in FIG. 8A, the gate of the first transistor M1 is electrically connected with the first input signal terminal INP1, and the first electrode of the first transistor M1 is electrically connected with the second input signal terminal INP2.

In the embodiment of the disclosure, the first input signal terminal INP1 and the second input signal terminal INP2 can be the same one signal terminal. For example, as shown in FIG. 8B, the gate and the first electrode of the first transistor M1 are both electrically connected with the first input signal terminal INP1.

In the embodiment of the disclosure, the fifth reference signal terminal VR5 and the first reference signal terminal VR1 can be the same one signal terminal. For example, as shown in FIGS. 8A and 8B, the first electrode of the eleventh transistor M11 and the first electrode of the second transistor M2 are both electrically connected with the first reference signal terminal VR1.

In the embodiment of the disclosure, the voltage of the signal at the first reference signal terminal VR1 can be made greater than the voltage of the signal at the second reference signal terminal VR2. And, the voltage vc1 of the signal of low level in the clock signal may be the same as the voltage vr2 of the second reference signal terminal VR2.

For example, the signal timing chart corresponding to the shift register unit shown in FIG. 8A may be as shown in FIG. 3. In each stage, the working process of each transistor can be basically the same as the working process in the above embodiment, and will not be repeated here.

For example, the signal timing chart corresponding to the shift register unit shown in FIG. 8B may be as shown in FIG. 7. In each stage, the working process of each transistor can be basically the same as the working process in the above embodiment, and will not be repeated here.

Figure 9A:
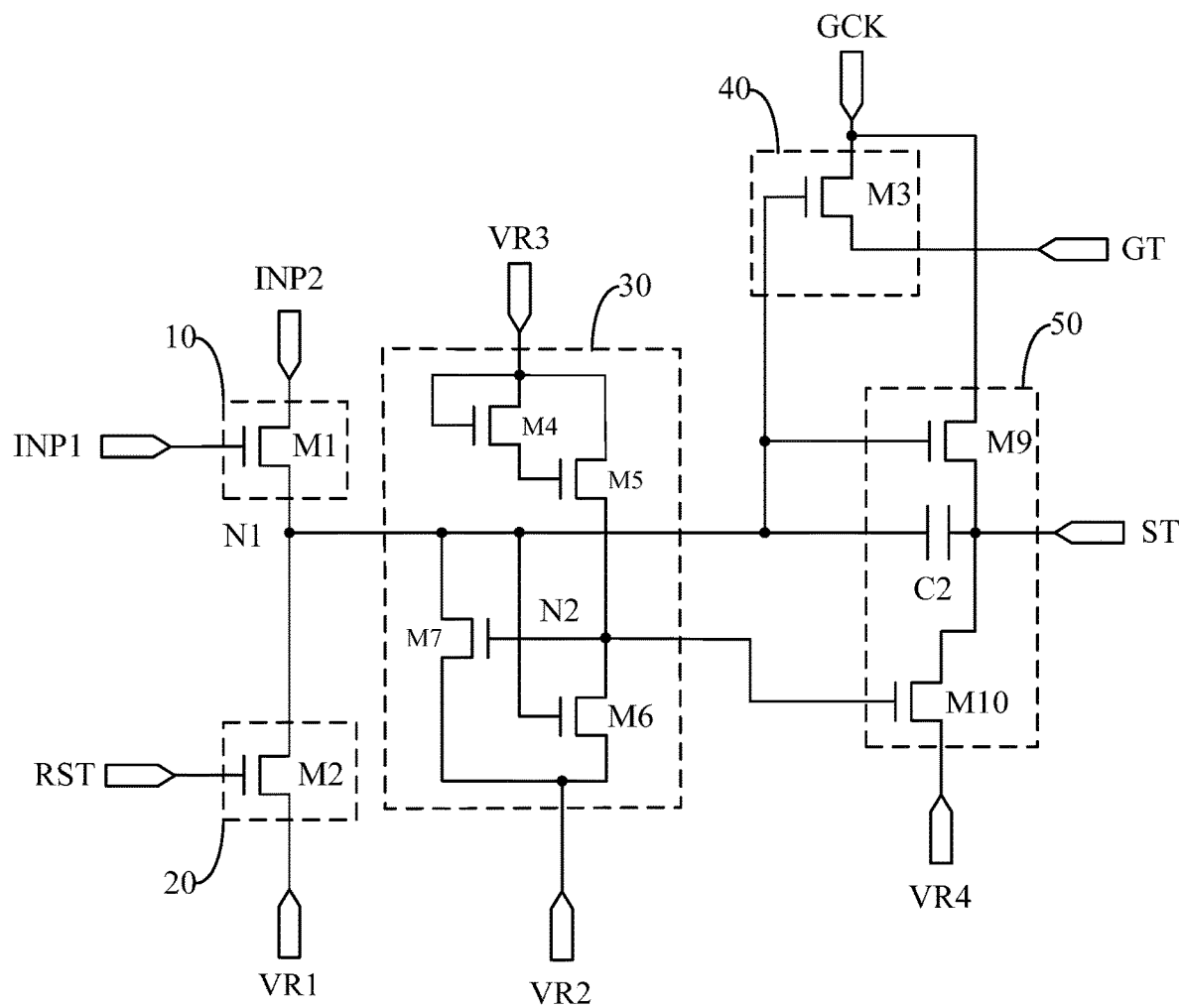
FIG. 9A is a schematic diagram of some other specific structures of a shift register unit according to embodiments of the disclosure.
Figure 9B:
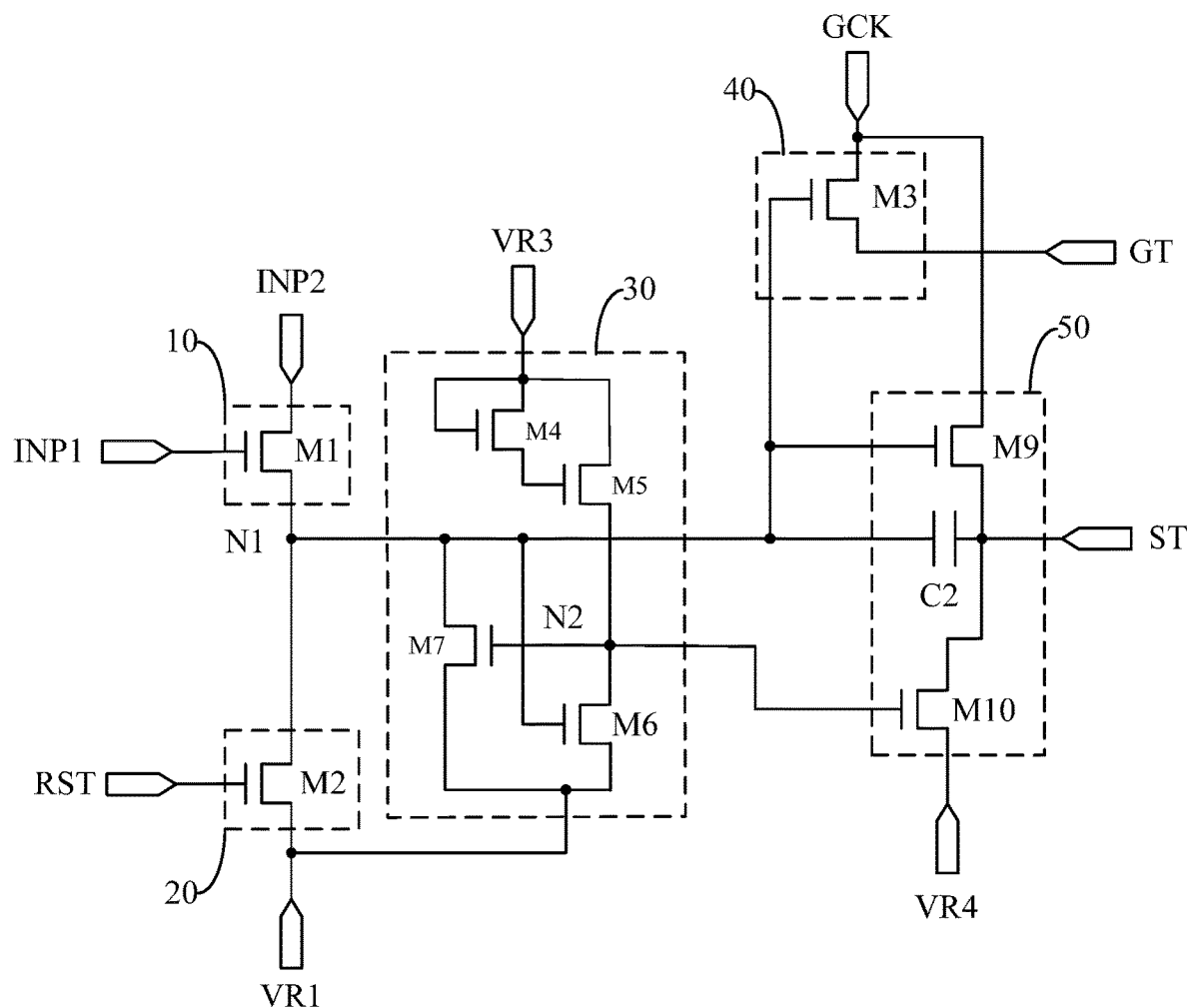
FIG. 9B is a schematic diagram of some other specific structures of a shift register unit according to embodiments of the disclosure.

Embodiments of the disclosure further provide some shift register units, whose schematic structural diagrams are as shown in FIGS. 9A and 9B, which are modified from the implementation in the above embodiments. Only the differences between this embodiment and the above-mentioned embodiment will be described below, and the similarities will not be repeated.

In the embodiment of the disclosure, the driving output circuit 50 is further configured to provide the signal from the fourth reference signal terminal VR4 to the driving output terminal ST in response to the signal at the second node N2. For example, as shown in FIGS. 9A and 9B, the driving output circuit 50 may include: a ninth transistor M9 and a tenth transistor M10 and a second capacitor C2. Here, a gate of the ninth transistor M9 is electrically connected with the first node N1, a first electrode of the ninth transistor M9 is electrically connected with the clock signal terminal GCK, and a second electrode of the ninth transistor M9 is electrically connected with the driving output terminal ST. A gate of the tenth transistor M10 is electrically connected with the second node N2, a first electrode of the tenth transistor M10 is electrically connected with the fourth reference signal terminal VR4, and the second electrode of the tenth transistor M10 is electrically connected with the driving output terminal ST. And, a first electrode plate of the second capacitor C2 is electrically connected with the first node N1, and the second electrode plate of the second capacitor C2 is electrically connected with the driving output terminal ST.

In the embodiment of the disclosure, the voltage vc1 of a signal of low level in the can be the same as the voltage vr2 at the second reference signal terminal VR2.

In the embodiment of the disclosure, the voltage vr1 of the first reference signal terminal VR1 can be the same as the voltage vr2 of the second reference signal terminal VR2.

In the embodiment of the disclosure, the first input signal terminal INP1 and the second input signal terminal INP2 can be independent of each other.

In the embodiment of the disclosure, the first reference signal terminal VR1 and the second reference signal terminal VR2 can be the same one signal terminal. The first reference signal terminal VR1 and the fourth reference signal terminal VR4 can be independent of each other, and the voltage at the first reference signal terminal VR1 is smaller than the voltage at the fourth reference signal terminal VR4. For example, as shown in FIG. 9B, a first electrode of the first transistor M1, a first electrode of the sixth transistor M6, and a first electrode of the seventh transistor M7 can all be electrically connected with the first reference signal terminal VR1.

For example, the signal timing chart corresponding to the shift register units shown in FIG. 9A and FIG. 9B may be as shown in FIG. 3. In each stage, the working process of each transistor can be basically the same as the working process in the above embodiment, and will not be repeated here.

Figure 10A:
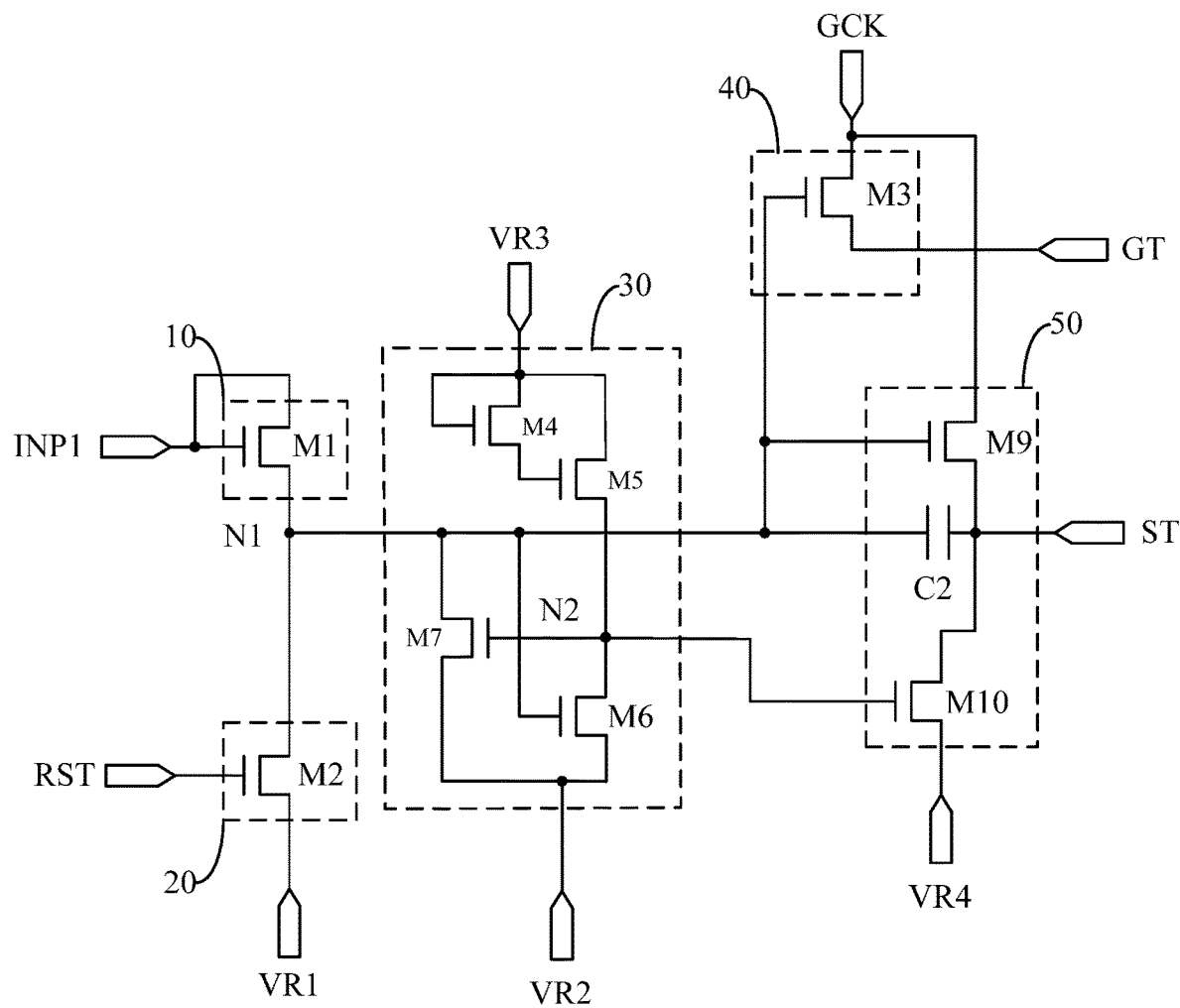
FIG. 10A is a schematic diagram of some other specific structures of a shift register unit according to embodiments of the disclosure.
Figure 10B:
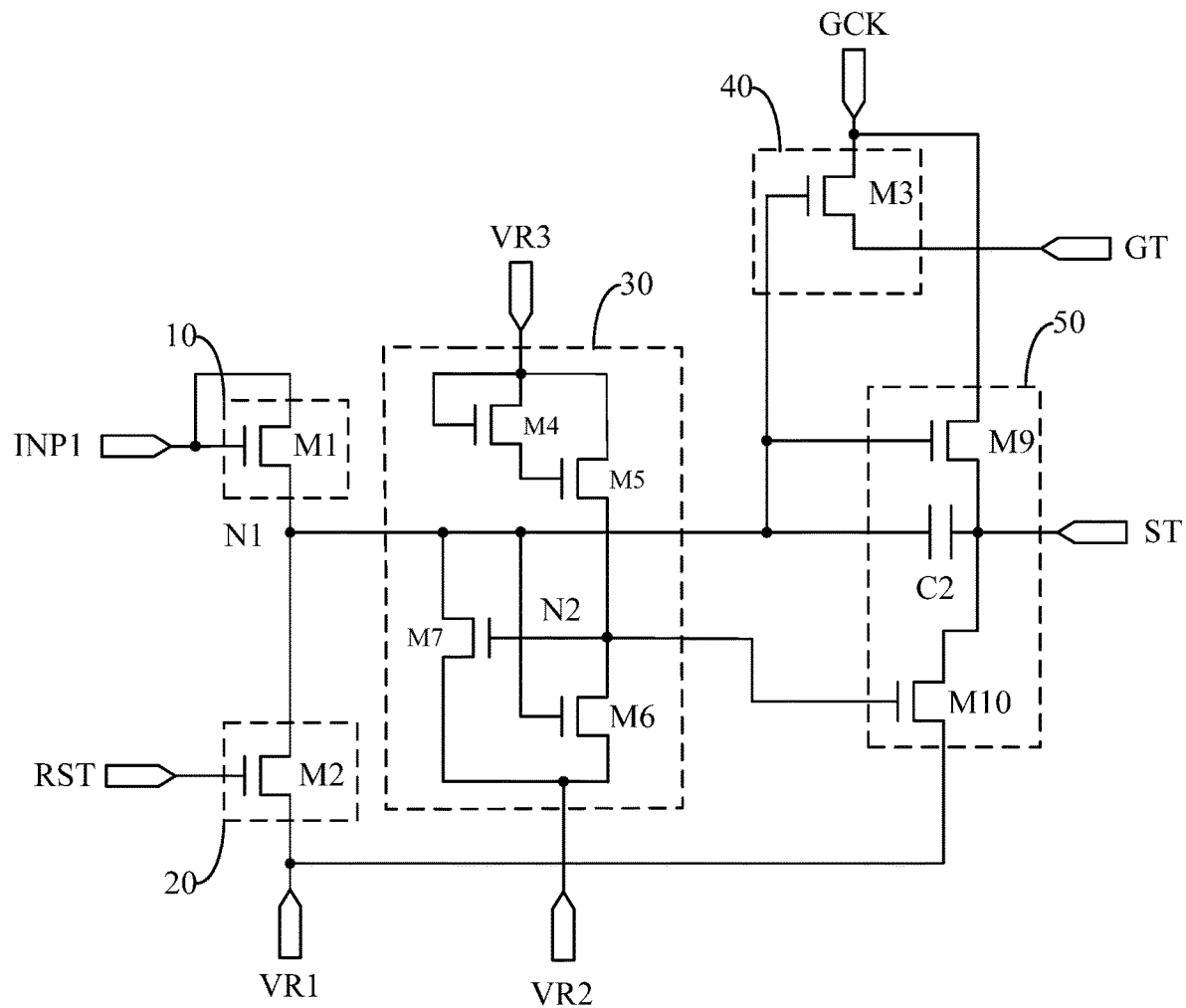
FIG. 10B is a schematic diagram of some other specific structures of a shift register unit according to embodiments of the disclosure.

Embodiments of the disclosure further provide some shift register units, whose schematic structural diagrams are as shown in FIG. 10A and FIG. 10B, which are modified from the implementation in the above embodiments. Only the differences between this embodiment and the above-mentioned embodiment will be described below, and the similarities will not be repeated.

In the embodiment of the disclosure, the first input signal terminal INP1 and the second input signal terminal INP2 can be the same one signal terminal. For example, as shown in FIGS. 10A and 10B, the gate and the first electrode of the first transistor M1 are both electrically connected with the first input signal terminal INP1.

In the embodiment of the disclosure, the voltage vc1 of a signal of low level in the clock signal can be the same as the voltage vr2 at the second reference signal terminal VR2.

In the embodiment of the disclosure, the second reference signal terminal VR2 and the first reference signal terminal VR1 can be independent of each other, and the voltage vr1 at the first reference signal terminal VR1 can be smaller than the voltage vr2 at the second reference signal terminal VR2.

In the embodiment of the disclosure, the voltage of the first reference signal terminal VR1 and the voltage of the fourth reference signal terminal VR4 can be set the same. Furthermore, the first reference signal terminal VR1 and the fourth reference signal terminal VR4 can be the same one signal terminal. For example, as shown in FIG. 10B, the first electrode of the second transistor M2 and the first electrode of the tenth transistor M10 are both electrically connected with the first reference signal terminal VR1.

For example, the signal timing chart corresponding to the shift register unit shown in FIG. 10A and FIG. 10B may be as shown in FIG. 7. In each stage, the working process of each transistor can be basically the same as the working process in the above embodiment, and will not be repeated here.

It should be noted that the specific voltage value of the above signal can be designed and determined according to the needs of actual applications, and is not limited here.

Figure 11:
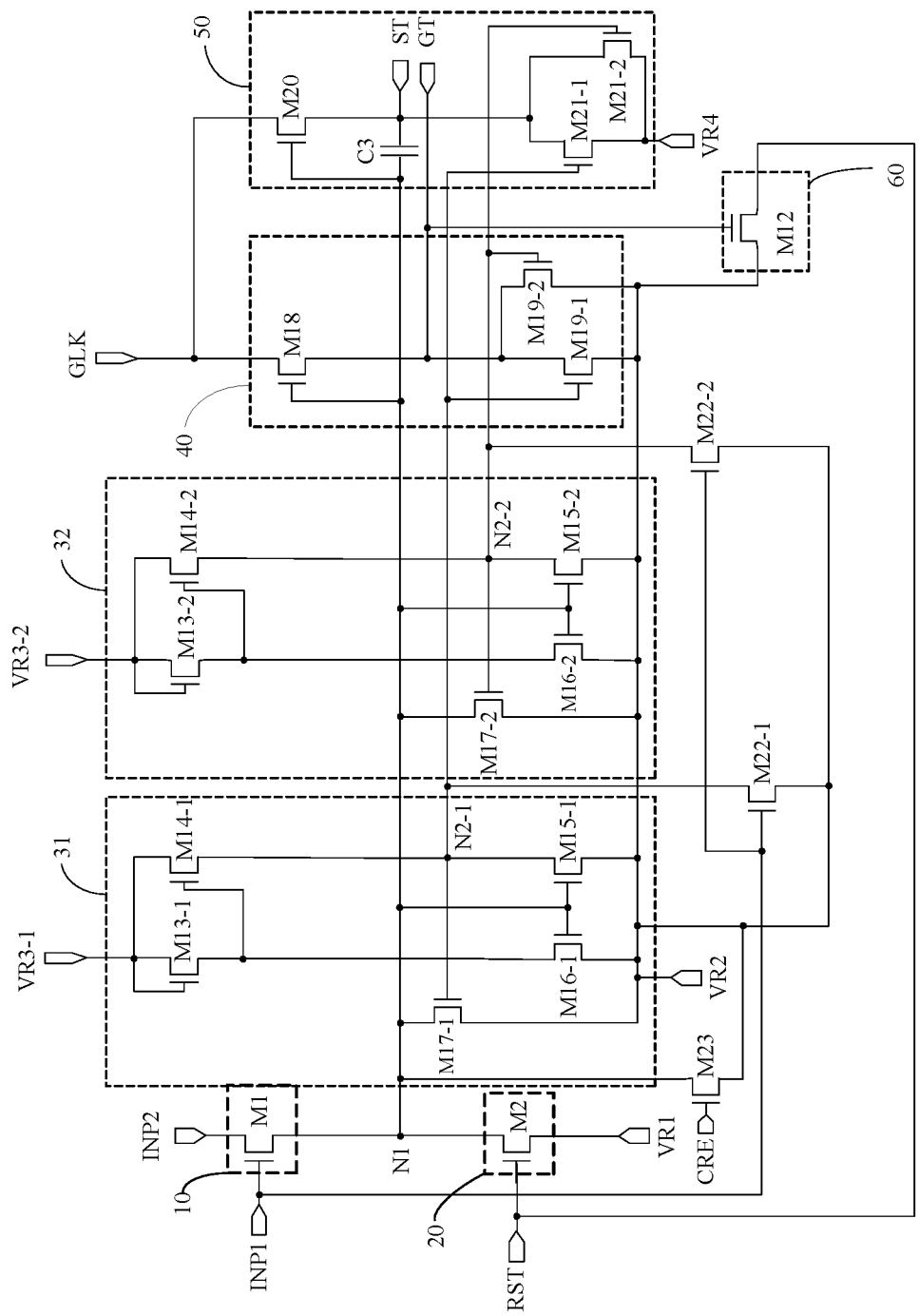
FIG. 11 is a schematic diagram of some other specific structures of a shift register unit according to embodiments of the disclosure.

Embodiments of the disclosure further provide some shift register units, whose schematic structural diagrams are as shown in FIG. 11, which are modified from the implementation in the above embodiments. Only the differences between this embodiment and the above-mentioned embodiment will be described below, and the similarities will not be repeated.

During specific implementation, in the embodiment of the disclosure, as shown in FIG. 11, the node control circuit 30 is further configured to adjust the level of the signal at the second node. The second node N2 may include M second sub-nodes. The node control circuit 30 may include M sub-control circuits. Here, an m-th sub-control circuit among the M sub-control circuits corresponds to an m-th second sub-node among the M second sub-nodes. Here, M is an integer and M≥1, m is an integer and 1≤m≤M. The m-th sub-control circuit is configured to adjust the signal at the m-th second sub-node and the signal at the first node N1. The cascade output circuit 40 is further configured to provide the signal from the second reference signal terminal VR2 to the cascade output terminal GT in response to the signals at the M second sub-nodes. The driving output circuit 50 is further configured to provide the signal from the fourth reference signal terminal VR4 to the cascade output terminal ST according to the signals at the M second sub-nodes.

For example, as shown in FIG. 11, the value of M can be 2, then the second node N2 may include: the first one of second sub-nodes N2-1 and the second one of second sub-nodes N2-2. The node control circuit 30 may include: a first sub-control circuit 31 corresponding to the first one of second sub-nodes N2-1, and a second sub-control circuit 32 corresponding to the second one of second sub-nodes N2-2. Here, the first sub-control circuit 31 is configured to adjust the signal at the first one of second sub-nodes N2-1 and the signal at the first node N1. The second sub-control circuit 32 is configured to adjust the signal at the second one of second sub-nodes N2-2 and the signal at the first node N1. The cascade output circuit 40 is configured to cause the cascade output terminal GT to output a signal according to the signal at the first node N1, the signal at the first one of second sub-nodes N2-1, and the signal at the second one of second sub-nodes N2-2. The driving output circuit 50 is configured to cause the driving output terminal ST to output a signal according to the signal at the first node N1, the signal at the first one of second sub-nodes N2-1, and the signal at the second one of second sub-nodes N2-2.

During specific implementation, the value of M can be 3, 4, or 5, etc., which can be set according to the actual application environment and is not limited here. The following will take M=2 as an example for explanation.

During specific implementation, in the embodiment of the disclosure, as shown in FIG. 11, the first sub-control circuit 31 corresponds to a first one of third reference signal terminals VR3-1. The first sub-control circuit 31 may include: a first one of thirteenth transistors M13-1, a first one of fourteenth transistors M14-1, a first one of fifteenth transistors M15-1, a first one of sixteenth transistors M16-1 and a first one of seventeenth transistors M17-1.

A gate and a first electrode of the first one of thirteenth transistors M13-1 are both electrically connected with the first one of third reference signal terminals VR3-1, and a second electrode of the first one of thirteenth transistors M13-1 is electrically connected with a gate of the first one of fourteenth transistors M14-1.

A first electrode of the first one of fourteenth transistors M14-1 is electrically connected with the first one of third reference signal terminals VR3-1, and a second electrode of the first one of fourteenth transistors M14-1 is electrically connected with the first one of second sub-nodes N2-1.

A gate of the first one of fifteenth transistors M15-1 is electrically connected with the first node N1, a first electrode of the first one of fifteenth transistors M15-1 is electrically connected with the second reference signal terminal VR2, and a second electrode of the first one of fifteenth transistors M15-1 is electrically connected with the first one of second sub-nodes N2-1.

A gate of the first one of sixteenth transistors M16-1 is electrically connected with the first node N1, a first electrode of the first one of sixteenth transistors M16-1 is electrically connected with the second reference signal terminal VR2, and a second electrode of the first one of sixteenth transistors M16-1 is electrically connected with the gate of the first one of fourteenth transistors M14-1.

A gate of the first one of seventeenth transistors M17-1 is electrically connected with the first one of second sub-nodes N2-1, a first electrode of the first one of seventeenth transistors M17-1 is electrically connected with the second reference signal terminal VR2, and a second electrode of the first one of seventeenth transistors M17-1 is electrically connected with the first node N1.

During specific implementation, in the embodiment of the disclosure, as shown in FIG. 11, the second sub-control circuit 32 corresponds to the second one of third reference signal terminals VR3-2. The second sub-control circuit 32 may include: a second one of thirteenth transistors M13-2, a second one of fourteenth transistors M14-2, a second one of fifteenth transistors M15-2, a second one of sixteenth transistors M16-2 and a second one of seventeenth transistors M17-2.

A gate and a first electrode of the second one of thirteenth transistors M13-2 are both electrically connected with the second one of third reference signal terminals VR3-2, and a second electrode of the second one of thirteenth transistors M13-2 is electrically connected with a gate of the second one of fourteenth transistors M14-2.

A first electrode of the second one of fourteenth transistors M14-2 is electrically connected with the second one of third reference signal terminals VR3-2, and a second electrode of the second one of fourteenth transistors M14-2 is electrically connected with the second one of second sub-nodes N2-2.

A gate of the second one of fifteenth transistors M15-2 is electrically connected with the first node N1, a first electrode of the second one of fifteenth transistors M15-2 is electrically connected with the second reference signal terminal VR2, and a second electrode of the second one of fifteenth transistors M15-2 is electrically connected with the second one of second sub-nodes N2-2.

A gate of the second one of sixteenth transistors M16-2 is electrically connected with the first node N1, a first electrode of the second one of sixteenth transistors M16-2 is electrically connected with the second reference signal terminal VR2, and a second electrode of the second one of sixteenth transistors M16-2 is electrically connected with the gate of the second one of fourteenth transistors M14-2.

A gate of the second one of seventeenth transistors M17-2 is electrically connected with the second one of second sub-nodes N2-2, a first electrode of the second one of seventeenth transistors M17-2 is electrically connected with the second reference signal terminal VR2, a second electrode of the second one of seventeenth transistors M17-2 is electrically connected with the first node N1.

During specific implementation, in the embodiment of the disclosure, as shown in FIG. 11, the cascade output circuit 40 may include: an eighteenth transistor M18, a first one of nineteenth transistors M19-1 and a second one of nineteenth transistor M19-2.

A gate of the eighteenth transistor M18 is electrically connected with the first node N1, a first electrode of the eighteenth transistor M18 is electrically connected with the clock signal terminal GLK, and the second electrode of the eighteenth transistor M18 is electrically connected with the cascade output terminal GT.

A gate of the first one of nineteenth transistors M19-1 is electrically connected with the first one of second sub-nodes N2-1, a first electrode of the first one of nineteenth transistors M19-1 is electrically connected with the second reference signal terminal VR2, and a second electrode of the first one of nineteenth transistors M19-1 is electrically connected with the cascade output terminal GT.

A gate of the second one of nineteenth transistors M19-2 is electrically connected with the second one of second sub-nodes N2-2, and a first electrode of the second one of nineteenth transistors M19-2 is electrically connected with the second reference signal terminal VR2, and a second electrode of the second one of nineteenth transistors M19-2 is electrically connected with the cascade output terminal GT.

During specific implementation, in the embodiment of the disclosure, a size of the nineteenth transistor M19-1 may be in a range of 200 μm-800 μm. Exemplarily, the size of the nineteenth transistor M19-1 may be set as 200 μm. Alternatively, the size of the nineteenth transistor M19-1 may also be set as 400 μm. Alternatively, the size of the nineteenth transistor M19-1 may also be set as 600 μm. Alternatively, the size of the nineteenth transistor M19-1 may also be set as 800 μm.

During specific implementation, in the embodiment of the disclosure, a size of the nineteenth transistor M19-2 may be in a range of 200 μm-800 μm. Exemplarily, the size of the nineteenth transistor M19-2 may be set as 200 μm. Alternatively, the size of the nineteenth transistor M19-2 may also be set as 400 μm. Alternatively, the size of the nineteenth transistor M19-2 may also be set as 600 μm. Alternatively, the size of the nineteenth transistor M19-2 may also be set as 800 μm.

During specific implementation, in the embodiment of the disclosure, the sizes of the nineteenth transistor M19-1 and the nineteenth transistor M19-2 can be set to be the same, so that the nineteenth transistor M19-1 and the nineteenth transistor M19-2 can be designed uniformly.

During specific implementation, in the embodiment of the disclosure, as shown in FIG. 11, the driving output circuit 50 may include: a twentieth transistor M20, a third capacitor C3, a first one of twenty-first transistors M21-1, and a second one of twenty-first transistors M21-2.

A gate of the twentieth transistor M20 is electrically connected with the first node N1, a first electrode of the twentieth transistor M20 is electrically connected with the clock signal terminal GLK, and a second electrode of the twentieth transistor M20 is electrically connected with the driving output terminal ST.

A first electrode of the third capacitor C3 is electrically connected with the first node N1, and a second electrode of the third capacitor C3 is electrically connected with the driving output terminal ST.

A gate of the first one of twenty-first transistors M21-1 is electrically connected with the first one of second sub-nodes N2-1, a first electrode of the first one of twenty-first transistors M21-1 is connected with the fourth reference signal terminal VR4, and a second electrode of the first one of twenty-first transistors M21-1 is electrically connected with the driving output terminal ST.

A gate of the second one of twenty-first transistors M21-2 is electrically connected with the second one of second sub-nodes N2-2, a first electrode of the second one of twenty-first transistors M21-2 is connected with the fourth reference signal terminal VR4, and a second electrode of the second one of twenty-first transistors M21-2 is electrically connected with the driving output terminal ST.

During specific implementation, in the embodiment of the disclosure, as shown in FIG. 11, the shift register unit may further include two twenty-second transistors: the first one of twenty-second transistors M22-1 and the second one of twenty-second transistor M22-2. Here, a gate of the first one of twenty-second transistors M22-1 and a gate of the second one of twenty-second transistors M22-2 are both electrically connected with the first input signal terminal INP1, a first electrode of the first one of twenty-second transistors M22-1 and a first electrode of the second one of twenty-second transistors M22-2 are both electrically connected with the second reference signal terminal VR2. A second electrode of the first one of twenty-second transistors M22-1 is electrically connected with the first one of second sub-nodes N2-1, and a second electrode of the second one of twenty-second transistors M22-2 is electrically connected with the second one of second sub-nodes N22-1.

During specific implementation, in the embodiment of the disclosure, as shown in FIG. 11, the shift register unit may further include a twenty-third transistor M23. A gate of the twenty-third transistor M23 is connected with the initial reset signal terminal CRE, a first electrode of the twenty-third transistor M23 is electrically connected with the second reference signal terminal VR2, and a second electrode of the twenty-third transistor M23 is electrically connected with the first node N1.

The above are only examples to illustrate the specific structure of the shift register unit provided by the embodiments of the disclosure. During specific implementation, the specific structures of the above-mentioned circuits are not limited to the above-mentioned structures provided by the embodiments of the disclosure, and may be other structures known to those skilled in the art, which are not limited here.

In order to reduce the manufacturing process, during specific implementation, in the shift register unit provided by the embodiment of the disclosure, as shown in FIG. 11, all transistors may be N-type transistors. Furthermore, the signal from the first reference signal terminal VR1 may be a signal of low level, the signal from the second reference signal terminal VR2 may be a signal of low level, and the signal from the fourth reference signal terminal VR4 may also be a signal of low level. The voltage of the signal from the first reference signal terminal VR1 can be made the same as the voltage of the signal from the second reference signal terminal VR2, so that the same one signal terminal can be used to provide voltages to the first reference signal terminal VR1 and the second reference signal terminal VR2, which reduces the number of signal terminals and reduces the difficulty of wiring. Alternatively, the second reference signal terminal VR2 and the first reference signal terminal VR1 may be independent of each other, and the voltage of the second reference signal terminal VR2 may be smaller than the voltage of the first reference signal terminal VR1, which allows the TFTs in the pixels in the display region of the display panel to be turned off as completely as possible. Of course, during specific implementation, all transistors may also be P-type transistors, which is not limited here.

For example, the first reference signal terminal VR1 and the fourth reference signal terminal VR4 are the same one signal terminal, so that the same one signal terminal can be used to provide voltages to the first reference signal terminal VR1 and the second reference signal terminal VR2, thereby reducing the number of signal terminals and reducing wiring difficulty.

Figure 12:
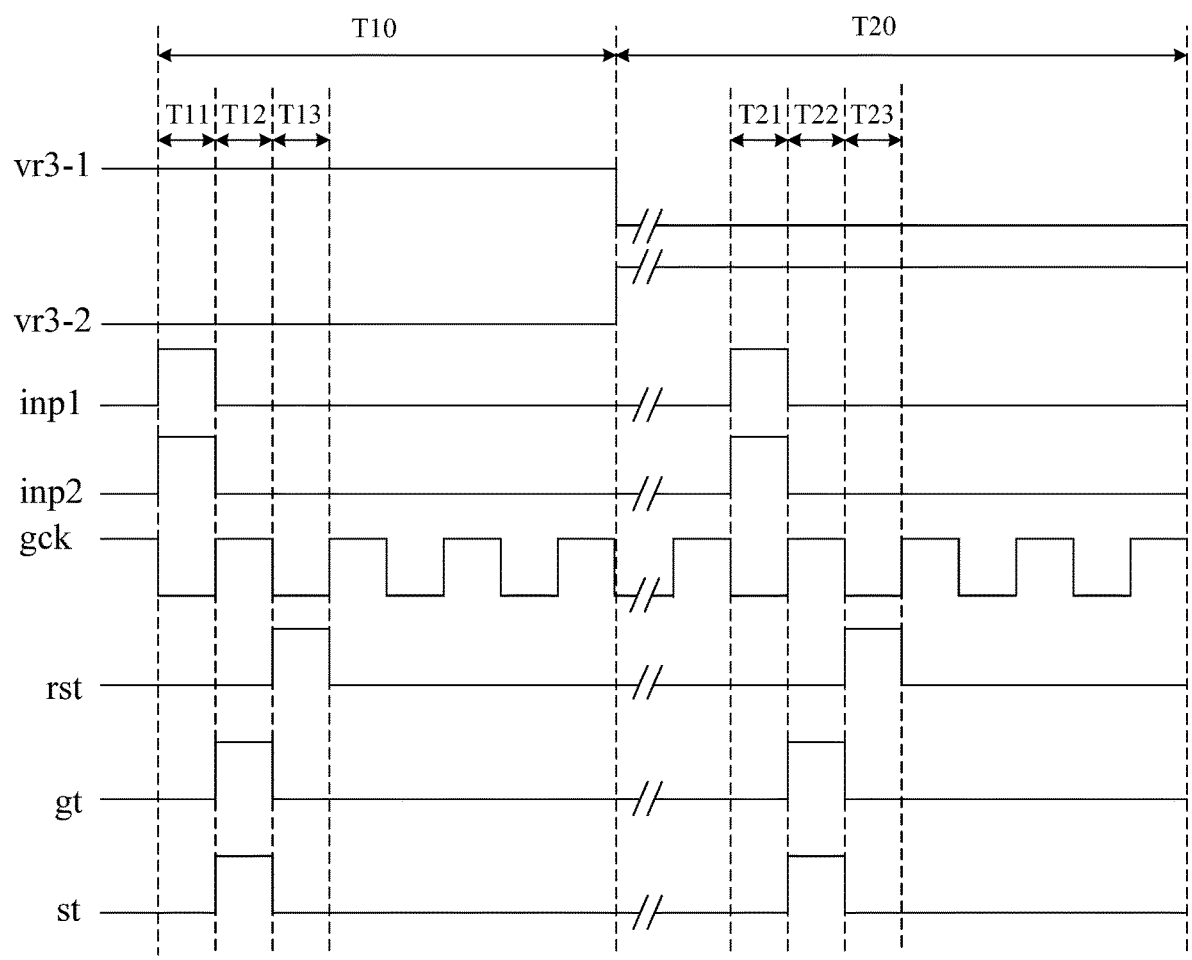
FIG. 12 is a timing chart for some other signals according to embodiments of the disclosure.

During specific implementation, the signal from the first one of third reference signal terminals VR3-1 and the signal from the second one of third reference signal terminals VR3-2 may both be a pulse signal that switches between a high level and a low level, and the level of the first one of third reference signal terminals VR3-1 is opposite to the level of the second one of third reference signal terminals VR3-2. For example, as shown in FIG. 12, in the stage T10, the first one of third reference signal terminals VR3-1 is of a signal of high level, and the second one of third reference signal terminals VR3-2 is of a signal of low level. In the stage T20, the first one of third reference signal terminals VR3-1 is of a signal of low level, and the second one of third reference signal terminals VR3-2 is of a signal of high level. Alternatively, the signal from the first one of third reference signal terminals VR3-1 and the signal from the second one of third reference signal terminals VR3-2 may be DC signals respectively. Moreover, when the first one of third reference signal terminals VR3-1 is provided with a DC signal of high level, the second one of third reference signal terminals VR3-2 is provided with no signal or a DC signal of low level. When the second one of third reference signal terminals VR3-2 is provided with a DC signal of high level, the first one of third reference signal terminals VR3-1 is provided with no signal or a DC signal of low level. For example, as shown in FIG. 12, in the stage T10, the first one of third reference signal terminals VR3-1 is a DC signal of high level, and the second one of third reference signal terminals VR3-2 is a DC signal of low level. In the stage T20, the first one of third reference signal terminals VR3-1 is a DC signal of low level, and the second one of third reference signal terminals VR3-2 is a DC signal of high level.

For example, the order of the stage T10 and the stage T20 can be determined according to the actual application. For example, the work process in stage T10 can be executed first, and then the work process in stage T20 can be executed. Alternatively, the work process in the stage T20 may be executed first, and then the work process in the stage T10 may be executed.

For example, the maintenance duration of the stage T10 can be the same as the maintenance duration of the stage T20. For example, the maintenance duration of the stage T10 and the maintenance duration of the stage T20 are respectively set to a duration of one display frame, a duration of multiple display frames, 2 s, 1 h, or 24 h, etc., which are not limited here.

Taking the structure of the shift register unit shown in FIG. 11 as an example, and combining the signal timing chart shown in FIG. 12, the working process of the above-mentioned shift register unit provided by the embodiment of the disclosure will be described in detail below. Here, the stage T10 and stage T20 in the signal timing chart shown in FIG. 12 are selected. Furthermore, a stage T11, a stage T12, and a stage T13 in the stage T10 are selected, and a stage T21, a stage T22, and a stage T23 in the stage T20 are selected. "vr3-1" represents the signal from the first one of third reference signal terminals VR3-1, and "vr3-2" represents the signal from the second one of third reference signal terminals VR3-2.

In the stage T10, since the second one of third reference signal terminals VR3-2 is of a signal of low level, the second one of thirteenth transistor M13-2 is turned off.

In the stage T11, the signal "rst" is a signal of low level, so the second transistor M2 is turned off. The signal "inp1" is a signal of high level, which can control the first transistor M1, the first one of twenty-second transistors M22-1, and the second one of twenty-second transistors M22-2 to be turned on. The signal "inp2" of high level is provided to the first node N1 via the turned-on first transistor M1, causing the first node N1 to be at the high level, thereby controlling the first one of fifteenth transistors M15-1, the first one of sixteenth transistors M16-1, the second one of fifteenth transistors M15-2, the second one of sixteenth transistors M16-2, the eighteenth transistor M18, and the twentieth transistor M20 all to be turned on. The signal of low level from the second reference signal terminal VR2 can be provided to the gate of the first one of fourteenth transistor M14-1 via the turned-on first one of sixteenth transistors M16-1 to control the first one of fourteenth transistor M14-1 to be turned off. The signal of low level from the second reference signal terminal VR2 can be provided to the first one of second sub-nodes N2-1 via the turned-on first one of fifteenth transistors M15-1, so that the first one of second sub-nodes N2-1 1 is of a signal of low level, thereby controlling the first one of seventeenth transistors M17-1, the first one of nineteenth transistors M19-1, and the first one of twenty-first transistors M21-1 to be turned off. Moreover, the signal of low level from the second reference signal terminal VR2 can be provided to the first one of second sub-nodes N2-1 via the turned-on first one of twenty-second transistors M22-1, further causing the first one of second sub-nodes N2-1 to be a signal of low level.

Further, the signal of low level from the second reference signal terminal VR2 can be provided to the gate of the second one of fourteenth transistors M14-2 via the turned-on second one of sixteenth transistors M16-2 to control the second one of fourteenth transistors M14-2 to be turned off. The signal of low level from the second reference signal terminal VR2 can be provided to the second one of second sub-nodes N2-2 via the turned-on second one of fifteenth transistors M15-2, so that the second one of second sub-nodes N2-2 is of a signal of low level, thereby controlling the second one of seventeenth transistors M17-2, the second one of nineteenth transistors M19-2, and the second one of twenty-first transistors M21-2 to be turned off. Furthermore, the signal of low level from the second reference signal terminal VR2 can be provided to the second one of second sub-nodes N2-2 via the turned-on second one of twenty-second transistors M22-2, further causing the second one of second sub-nodes N2-2 to be of a signal of low level.

Further, the turned-on eighteenth transistor M18 can provide the signal of low level from the clock signal terminal CLK to the cascade output terminal GT, so that the cascade output terminal GT outputs a signal of low level. The signal of low level from the clock signal terminal CLK can be provided to the driving output terminal ST via the turned-on twentieth transistor M20, so that the driving output terminal ST outputs a signal of low level.

In the T12 stage, the signal "rst" is a signal of low level, so the second transistor M2 is turned off. The signal "inp1" is a signal of low level, the first transistor M1, the first one of twenty-second transistors M22-1, and the second one of twenty-second transistors M22-2 can be controlled to be turned off. Due to the third capacitor C3, the first node N1 can remain to be a signal of high level. Since the first node N1 is of the signal of high level, the first one of fifteenth transistors M15-1, the first one of sixteenth transistors M16-1, the second one of fifteenth transistors M15-2, and the second one of sixteenth transistors M16-2, the eighteenth transistor M18, and the twentieth transistor M20 are all turned on. The signal of low level from the second reference signal terminal VR2 can be provided to the gate of the first one of fourteenth transistors M14-1 via the turned-on first one of sixteenth transistor M16-1 to control the first one of fourteenth transistors M14-1 to be turned off. The signal of low level from the second reference signal terminal VR2 can be provided to the first one of second sub-nodes N2-1 via the turned-on first one of fifteenth transistors M15-1, so that the first one of second sub-nodes N2-1 is of a signal of low level, thereby controlling the first one of seventeenth transistors M17-1, the first one of nineteenth transistors M19-1, and the first one of twenty-first transistors M21-1 to be turned off.

Further, the signal of low level from the second reference signal terminal VR2 can be provided to the gate of the second one of fourteenth transistors M14-2 via the turned-on second one of sixteenth transistors M16-2 to control the second one of fourteenth transistors M14-2 to be turned off. The signal of low level from the second reference signal terminal VR2 can be provided to the second one of second sub-nodes N2-2 via the turned-on second one of fifteenth transistors M15-2, so that the second one of second sub-nodes N2-2 is of a signal of low level, thereby controlling the second one of seventeenth transistors M17-2, the second one of nineteenth transistors M19-2, and the second one of twenty-first transistors M21-2 to be turned off.

The signal of high level from the clock signal terminal GLK can be provided to the cascade output terminal GT via the turned-on eighteenth transistor M18, so that the cascade output terminal GT outputs a signal of high level. The signal of high level from the clock signal terminal GLK can be provided to the driving output terminal ST via the turned-on twentieth transistor M20. Since the first node N1 is floating, the first node N1 is further pulled up, so that the twentieth transistor M20 can be completely turned on as much as possible, and the signal of high level from the clock signal terminal GLK can be provided to the driving output terminal ST without voltage loss as much as possible, which allows the driving output terminal ST to output a signal of high level.

In the stage T13, the signal "inp1" is a signal of low level, which can control the first transistor M1, the first one of twenty-second transistors M22-1 and the second one of twenty-second transistors M22-2 to be turned off. The signal "rst" is a signal of high level, so the second transistor M2 is turned on, and the signal of low level from the first reference signal terminal VR1 is provided to the first node N1, so that the first node N1 is of a signal of low level, thereby controlling the first one of fifteenth transistors M15-1, the first one of sixteenth transistors M16-1, the second one of fifteenth transistors M15-2, the second one of sixteenth transistors M16-2, the eighteenth transistor M18 and the twentieth transistor M20 to be turned off. Moreover, the second one of second sub-nodes N2-2 remains to be a signal of low level, thereby controlling the second one of seventeenth transistors M17-2, the second one of nineteenth transistors M19-2 and the second one of twenty-first transistors M21-2 all to be turned off.

The first one of thirteenth transistor M13-1 is turned on under the control of the signal of high level from the first third reference signal terminal VR3-1, and the signal of high level from the first third reference signal terminal VR3-1 is provided to the gate of the first one of fourteenth transistors M14-1, thereby controlling the first one of fourteenth transistors M14-1 to be turned on. The signal of high level from the first third reference signal terminal VR3-1 can be provided to the first one of second sub-nodes N2-1 via the turned-on first one of fourteenth transistors M14-1, so that the first one of second sub-nodes N2-1 is of a signal of high level, thereby controlling the first one of seventeenth transistors M17-1, the first one of nineteenth transistors M19-1 and the first one of twenty-first transistors M21-1 to all be turned on. The signal of low level from the second reference signal terminal VR2 can be provided to the first node N1 via the turned-on first one of seventeenth transistor M17-1, so that the first node N1 is further of a signal of low level. The signal of low level from the second reference signal terminal VR2 can be provided to the cascade output terminal GT via the turned-on first one of nineteenth transistors M19-1, so that the cascade output terminal GT outputs a signal of low level. The signal of low level from the fourth reference signal terminal VR4 can be provided to the driving output terminal ST via the turned-on first one of twenty-first transistors M21-1, so that the driving output terminal ST outputs a signal of low level.

In the stage T20, since the first one of third reference signal terminal VR3-1 is a signal of low level, the first one of thirteenth transistor M13-1 is turned off.

In the stage T21, the signal "rst" is a signal of low level, so the second transistor M2 is turned off. The signal "inp1" is a signal of high level, which can control the first transistor M1, the first one of twenty-second transistors M22-1, and the second one of twenty-second transistors M22-2 to be turned on. The signal "inp2" of high level is provided to the first node N1 via the turned-on first transistor M1, causing the first node N1 to be at the high level, thereby controlling the first one of fifteenth transistors M15-1, the first one of sixteenth transistors M16-1, the second one of fifteenth transistors M15-2, the second one of sixteenth transistors M16-2, the eighteenth transistor M18, and the twentieth transistor M20 all to be turned on. The signal of low level from the second reference signal terminal VR2 can be provided to the gate of the first one of fourteenth transistor M14-1 via the turned-on first one of sixteenth transistors M16-1 to control the first one of fourteenth transistor M14-1 to be turned off. The signal of low level from the second reference signal terminal VR2 can be provided to the first one of second sub-nodes N2-1 via the turned-on first one of fifteenth transistors M15-1, so that the first one of second sub-nodes N2-1 1 is of a signal of low level, thereby controlling the first one of seventeenth transistors M17-1, the first one of nineteenth transistors M19-1, and the first one of twenty-first transistors M21-1 to be turned off. Moreover, the signal of low level from the second reference signal terminal VR2 can be provided to the first one of second sub-nodes N2-1 via the turned-on first one of twenty-second transistors M22-1, further causing the first one of second sub-nodes N2-1 to be a signal of low level.

Further, the signal of low level from the second reference signal terminal VR2 can be provided to the gate of the second one of fourteenth transistors M14-2 via the turned-on second one of sixteenth transistors M16-2 to control the second one of fourteenth transistors M14-2 to be turned off. The signal of low level from the second reference signal terminal VR2 can be provided to the second one of second sub-nodes N2-2 via the turned-on second one of fifteenth transistors M15-2, so that the second one of second sub-nodes N2-2 is of a signal of low level, thereby controlling the second one of seventeenth transistors M17-2, the second one of nineteenth transistors M19-2, and the second one of twenty-first transistors M21-2 to be turned off. Furthermore, the signal of low level from the second reference signal terminal VR2 is provided to the second one of second sub-nodes N2-2 via the turned-on second one of twenty-second transistors M22-2, further causing the second one of second sub-node N2-2 to be of a signal of low level.

Further, the signal of low level from the clock signal terminal CLK can be provided to the cascade output terminal GT via the turned-on eighteenth transistor M18, causing the cascade output terminal GT to output a signal of low level. The signal of low level from the clock signal terminal CLK can be provided to the driving output terminal ST via the turned-on twentieth transistor M20, causing the driving output terminal ST to output a signal of low level.

In the stage T22, the signal "rst" is a signal of low level, so the second transistor M2 is turned off. The signal "inp1" is a signal of low level, the first transistor M1, the first one of twenty-second transistors M22-1, and the second one of twenty-second transistors M22-2 can be controlled to be turned off. Due to the third capacitor C3, the first node N1 can remain to be a signal of high level. Since the first node N1 is of the signal of high level, the first one of fifteenth transistors M15-1, the first one of sixteenth transistors M16-1, the second one of fifteenth transistors M15-2, and the second one of sixteenth transistors M16-2, the eighteenth transistor M18, and the twentieth transistor M20 are all turned on. The signal of low level from the second reference signal terminal VR2 can be provided to the gate of the first one of fourteenth transistors M14-1 via the turned-on first one of sixteenth transistor M16-1 to control the first one of fourteenth transistors M14-1 to be turned off. The signal of low level from the second reference signal terminal VR2 can be provided to the first one of second sub-nodes N2-1 via the turned-on first one of fifteenth transistors M15-1, so that the first one of second sub-nodes N2-1 is of a signal of low level, thereby controlling the first one of seventeenth transistors M17-1, the first one of nineteenth transistors M19-1, and the first one of twenty-first transistors M21-1 to be turned off. The signal of low level from the second reference signal terminal VR2 can be provided to the gate of the second one of fourteenth transistors M14-2 via the turned-on second one of sixteenth transistors M16-2 to control the second one of fourteenth transistors M14-2 to be turned off. The signal of low level from the second reference signal terminal VR2 can be provided to the second one of second sub-nodes N2-2 via the turned-on second one of fifteenth transistors M15-2, so that the second one of second sub-nodes N2-2 2 is of a signal of low level, thereby controlling the second one of seventeenth transistors M17-2, the second one of nineteenth transistors M19-2, and the second one of twenty-first transistors M21-2 to be turned off.

The signal of high level from the clock signal terminal GLK can be provided to the cascade output terminal GT via the turned-on eighteenth transistor M18, allowing the cascade output terminal GT to output a signal of high level. The signal of high level from the clock signal terminal GLK can be provided to the driving output terminal ST via the turned-on twentieth transistor M20. Since the first node N1 is floating, the first node N1 is further pulled up, so that the twentieth transistor M20 can be fully turned on as much as possible, causing the signal of high level from the clock signal terminal GLK to be provided to the driving output terminal ST without voltage loss as much as possible, which allows the driving output terminal ST to output a signal of high level.

In the stage T23, the signal "inp1" is a signal of low level, which can control the first transistor M1, the first one of twenty-second transistors M22-1 and the second one of twenty-second transistors M22-2 to be turned off. The signal "rst" is a signal of high level, so the second transistor M2 is turned on and the signal of low level from the first reference signal terminal VR1 is provided to the first node N1, so that the first node N1 is of a signal of low level, thereby controlling the first one of fifteenth transistors M15-1, the first one of sixteenth transistors M16-1, the second one of fifteenth transistors M15-2, the second one of sixteenth transistors M16-2, the eighteenth transistor M18 and the twentieth transistor M20 to be turned off. Moreover, the first one of second sub-nodes N2-1 remains to be a signal of low level, thereby controlling the first one of seventeenth transistors M17-1, the first one of nineteenth transistors M19-1 and the first one of twenty-first transistors M21-1 to be turned off.

The second one of thirteenth transistors M13-2 is turned on under the control of the signal of high level from the second third reference signal terminal VR3-2, and the signal of high level from the second third reference signal terminal VR3-2 is provided to the gate of the second one of fourteenth transistors M14-2, thereby controlling the second one of fourteenth transistors M14-2 to be turned on. The signal of high level from the second third reference signal terminal VR3-2 can be provided to the second one of second sub-nodes N2-2 via the turned-on second one of fourteenth transistor M14-2, so that the second one of second sub-nodes N2-2 is of a signal of high level, thereby controlling the second one of seventeenth transistors M17-2, the second one of nineteenth transistors M19-2 and the second one of twenty-first transistors M21-2 to all be turned on. The signal of low level from the second reference signal terminal VR2 can be provided to the first node N1 via the turned-on second one of seventeenth transistors M17-2, so that the first node N1 is of a signal of low level. The signal of low level from the second reference signal terminal VR2 can be provided to the cascade output terminal GT via the turned-on second one of nineteenth transistors M19-2, so that the cascade output terminal GT can output a signal of low level. The signal of low level from the fourth reference signal terminal VR4 can be provided to the driving output terminal ST via the turned-on second one of twenty-first transistors M21-2, so that the driving output terminal ST can output a signal of low level.

Moreover, in the above-mentioned shift register unit provided by the embodiment of the disclosure, in the stage T10, the first sub-control circuit 31 operates. In the stage T20, the second sub-control circuit 32 operates. As a result, the characteristics of the transistors can be restored alternately, thereby reducing the impact on the stability and life of the output signal caused by the characteristic drift caused by the use of the transistors, thereby improving the life of the product and reducing production costs.

Figure 13:
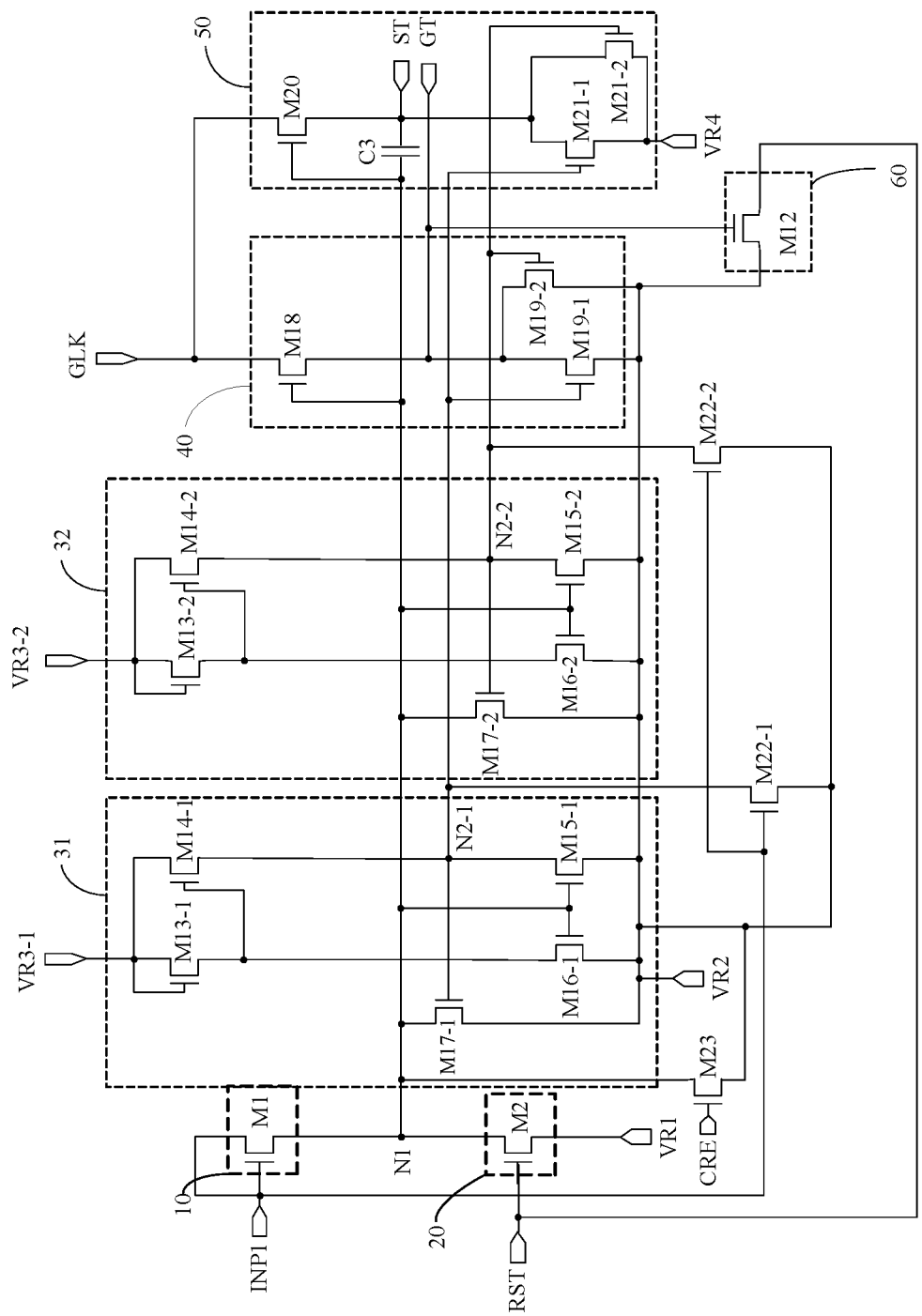
FIG. 13 is a schematic diagram of some other specific structures of a shift register unit according to embodiments of the disclosure.

In the embodiment of the disclosure, the first input terminal and the second input signal terminal can also be set to the same one signal terminal. For example, as shown in FIG. 13, both the gate and the first electrode of the first transistor M1 are electrically connected with the first input terminal INP1.

Embodiments of the disclosure further provide a gate driving circuit including a plurality of the above-mentioned shift register units in cascade. When the first input signal terminal INP1 and the second input signal terminal INP2 are signal terminals independent of each other, the first input signal terminal INP1 of the first-stage shift register unit is electrically connected with the cascade start signal terminal GTV. The second input signal terminal INP2 of the first-stage shift register unit is electrically connected with the frame start signal terminal STV. Moreover, the signal of the cascade start signal terminal GTV and the signal of the frame start signal terminal STV are the same. And, in every M cascaded shift register units that are adjacent to one another, the first input signal terminal INP1 of the M-th shift register unit is electrically connected with the cascade output terminal GT of the first shift register unit, and the M-th second input signal terminal INP2 of the first shift register unit is electrically connected with the driving output terminal ST of the first shift register unit; and, in every (M+1) cascaded shift register units that are adjacent to one another, the reset signal terminal RST of the first shift register unit is electrically connected with the cascade output terminal GT of the (M+1)-th shift register unit. Here, M is an integer greater than 1.

For example, when the first input signal terminal INP1 and the second input signal terminal INP2 are independent of each other, in every M cascaded shift register units that are adjacent to one another, a trace electrically connecting the first input signal terminal INP1 of the M-th shift register unit and the cascade output terminal GT of the first shift register unit has a first length CH1. And, a trace electrically connecting the second input signal terminal INP2 of the M-th shift register unit and the driving output terminal ST of the first shift register unit has a second length CH2. Here, CH1/CH2 can be in a range of 1.0-1.5. In this way, according to the area of the wiring space, layout of the trace electrically connecting the first input signal terminal INP1 of the M-th shift register unit and the cascade output terminal GT of the first shift register unit and the trace electrically connecting the second input signal terminal INP2 of the M-th shift register unit and the driving output terminal ST of the first shift register unit can be designed reasonably. Moreover, the second length CH2 is smaller than the first length CH1, which can reduce the signal delay of the second input signal terminal INP2 of the shift register unit.

For example, CH1/CH2 can be 1.0, 1.1, 1.2, 1.3, 1.4, or 1.5, which is not limited here.

For example, taking M=7 as an example, when the first input signal terminal INP1 and the second input signal terminal INP2 are independent of each other, among every seven cascaded shift register units that are adjacent to one another, the first input signal terminal INP1 of the seventh shift register unit is electrically connected with the cascade output terminal GT of the first shift register unit, and the second input signal terminal INP2 of the seventh shift register unit is electrically connected with the driving output terminal ST of first shift register unit. In addition, in every 8 cascaded shift register units that are adjacent to one another, the reset signal terminal RST of the first shift register unit is connected with the cascade output terminal GT of the eighth shift register unit.

Figure 14:
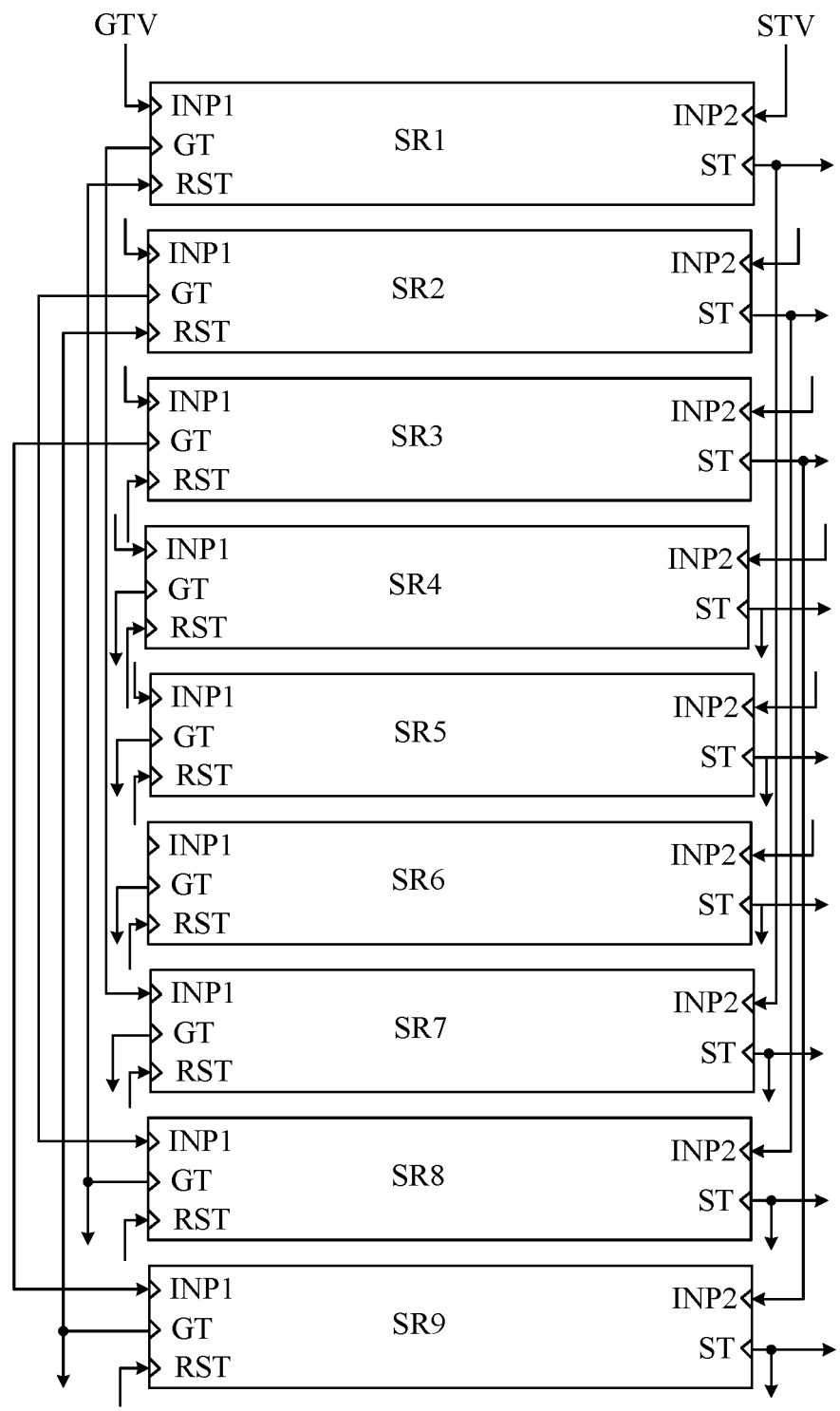
FIG. 14 is a schematic diagram of some other specific structures of a gate driving circuit according to embodiments of the disclosure.
Figure 15A:
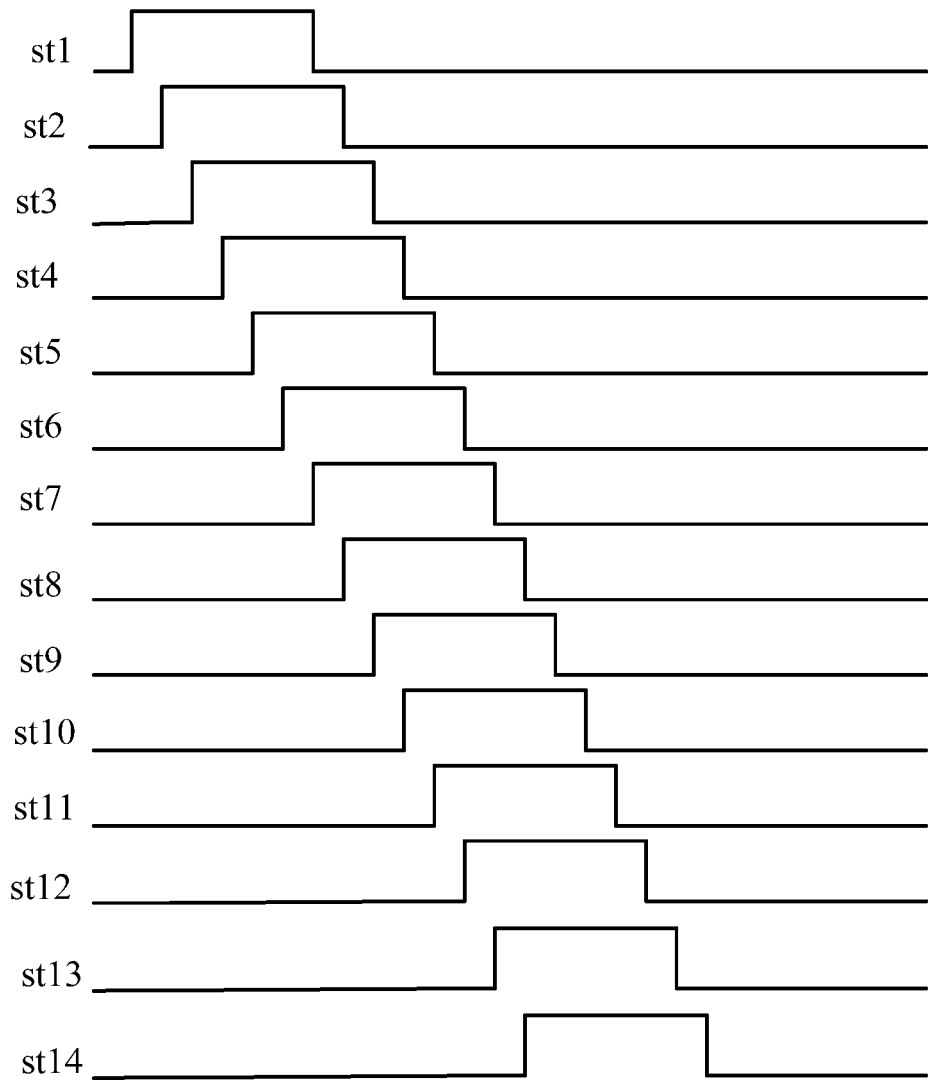
FIG. 15A is a schematic diagram of signals at a cascade output terminal of a gate driving circuit according to embodiments of the disclosure.

For example, as shown in FIG. 14 and FIG. 15A, the cascade output terminal GT of the first-stage shift register unit SR1 is electrically connected with the first input signal terminal INP1 of the seventh-stage shift register unit SR7. That is, the signal "st1" from the cascade output terminal GT of the first-stage register unit SR1 serves as the signal input into the first input signal terminal INP1 of the seventh-stage shift register unit SR7. The cascade output terminal GT of the second-stage shift register unit SR2 is electrically connected with the first input signal terminal INP1 of the eighth-stage shift register unit SR8. That is, the signal "st2" from the cascade output terminal GT of the second-stage shift register unit SR2 serves as the signal provided to the first input signal terminal INP1 of the eighth-stage shift register unit SR8. The cascade output terminal GT of the third-stage shift register unit SR3 is electrically connected with the first input signal terminal INP1 of the ninth-stage shift register unit SR9. That is, the signal "st3" from the cascade output terminal GT of the third-stage shift register unit SR3 serves as the signal provided to the first input signal terminal INP1 of the ninth-stage shift register unit SR9. The rest can be done in the similar manner and will not be described in detail here.

For example, as shown in FIG. 14 and FIG. 15A, the cascade output terminal GT of the eighth-stage shift register unit SR8 is electrically connected with the reset signal terminal RST of the first-stage shift register unit SR1. That is, the signal "st8" from the cascade output terminal GT of the eighth-stage shift register unit SR8 serves as the signal provided to the reset signal terminal RST of the first-stage shift register unit SR1. The cascade output terminal GT of the ninth-stage shift register unit SR9 is electrically connected with the reset signal terminal RST of the second-stage shift register unit SR2. That is, the signal "st9" from the cascade output terminal GT of the ninth-stage shift register unit SR9 serves as the signal provided to the reset signal terminal RST of the second-stage shift register unit SR2. The rest can be done in the similar manner and will not be described in detail here.

Figure 15B:
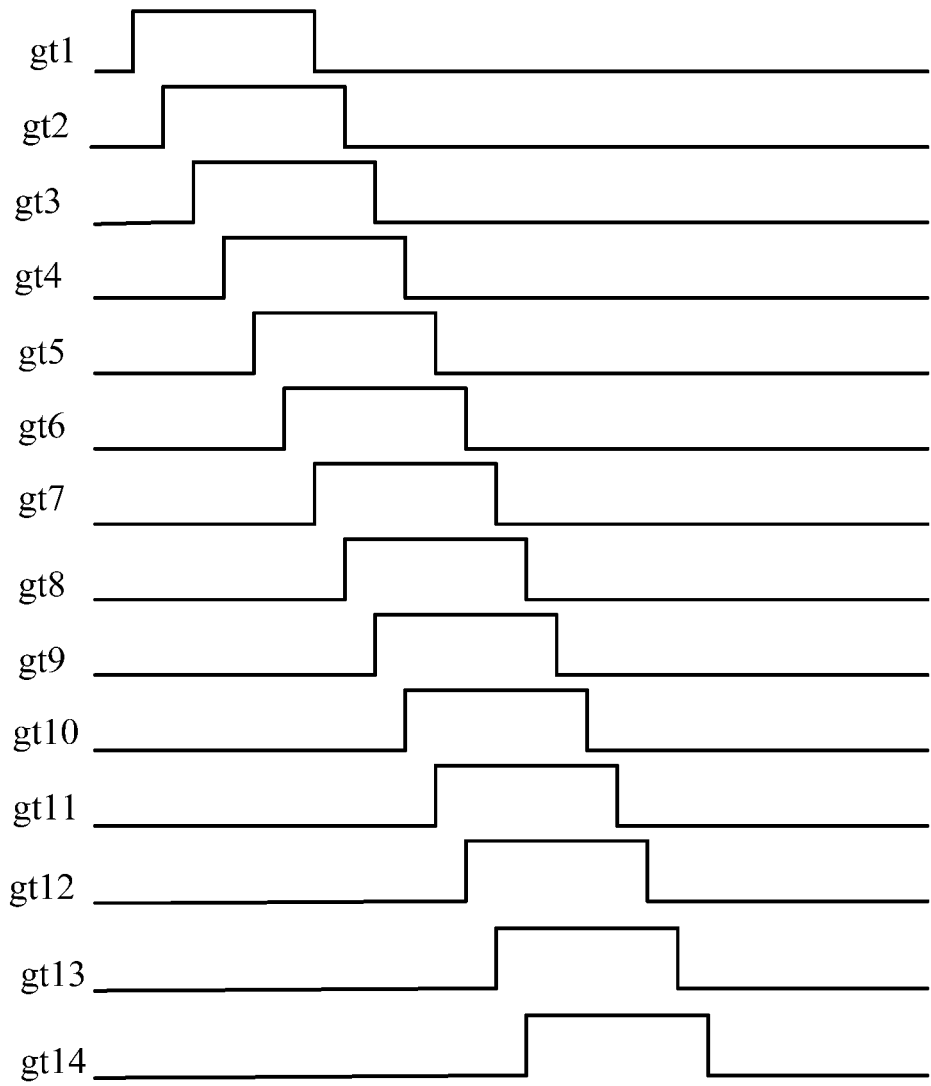
FIG. 15B is a schematic diagram of signals at a driving output terminal of a gate driving circuit according to embodiments of the disclosure.

For example, as shown in FIG. 14 and FIG. 15B, the driving output terminal ST of the first-stage shift register unit SR1 is electrically connected with the second input signal terminal INP2 of the seventh-stage shift register unit SR7. That is, the signal "gt1" from the driving output terminal ST of the first-stage shift register unit SR1 serves as the signal provided to the second input signal terminal INP2 of the seventh-stage shift register unit SR7. The driving output terminal ST of the second-stage shift register unit SR2 is electrically connected with the second input signal terminal INP2 of the eighth-stage shift register unit SR8. That is, the signal "gt2" from the driving output terminal ST of the second-stage shift register unit SR2 serves as the signal provided to the second input signal terminal INP2 of the eighth-stage shift register unit SR8. The driving output terminal ST of the third-stage shift register unit SR3 is electrically connected with the second input signal terminal INP2 of the ninth-stage shift register unit SR9. That is, the signal "gt3" from the driving output terminal ST of the third-stage shift register unit SR3 serves as the signal provided to the second input signal terminal INP2 of the ninth-stage shift register unit SR9. The rest can be done in a similar manner and will not be described in detail here.

In the gate driving circuit as shown in FIG. 14, the cascade output terminals GT of the first-stage shift register unit to the fourteenth-stage shift register unit output signals "st1" to "st14". The driving output terminals ST of the first-stage shift register unit to the fourteenth-stage shift register unit output signals "gt1" to "gt14".

Of course, in actual applications, M can be set as other values, which can be designed and determined according to the needs of actual applications and is not limited here.

Other gate driving circuits provided by embodiments of the disclosure include a plurality of the above-mentioned shift register units in cascade. When the first input signal terminal INP1 and the second input signal terminal INP2 are the same one signal terminal, the first input signal terminal INP1 of the first-stage shift register unit is electrically connected with the frame start signal terminal STV. In every M cascaded shift register units that are adjacent to one another, the first input signal terminal INP1 of the M-th shift register unit is electrically connected with the cascade output terminal GT of the first shift register unit; and in every (M+1) cascaded shift register units that are adjacent to one another, the reset signal terminal RST of the first shift register unit is electrically connected with the cascade output terminal GT of the (M+1)-th shift register unit. Here, M is an integer greater than 1.

For example, taking M=7 as an example, when the first input signal terminal INP1 and the second input signal terminal INP2 are the same one signal terminal, among every seven cascaded shift register units that are adjacent to one another, the first input signal terminal INP1 of the seventh shift register unit is electrically connected with the cascade output terminal GT of the first shift register unit; and among every 8 cascaded shift register units that are adjacent to one another, the reset signal terminal RST of the first shift register unit is electrically connected with the cascade output terminal GT of the eighth shift register unit.

Figure 16:
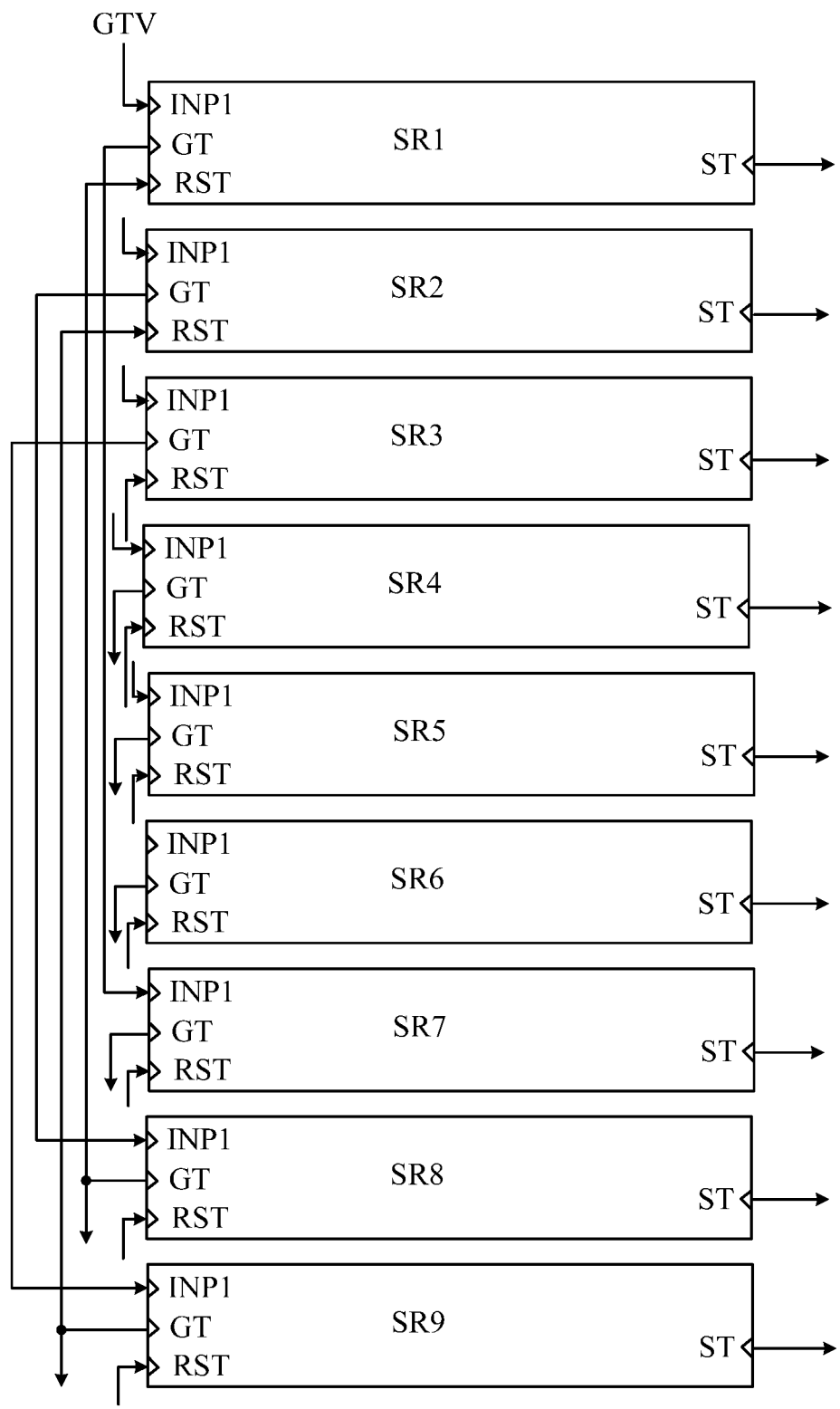
FIG. 16 is a schematic diagram of some other specific structures of a gate driving circuit according to embodiments of the disclosure.

For example, as shown in FIG. 16 and FIG. 15A, the cascade output terminal GT of the first-stage shift register unit SR1 is electrically connected with the first input signal terminal INP1 of the seventh-stage shift register unit SR7. That is, the signal "st1" from the cascade output terminal GT of the shift register unit SR1 serves as the signal provided to the first input signal terminal INP1 of the seventh-stage shift register unit SR7. The cascade output terminal GT of the second-stage shift register unit SR2 is electrically connected with the first input signal terminal INP1 of the eighth-stage shift register unit SR8. That is, the signal "st2" from the cascade output terminal GT of the second-stage shift register unit SR2 serves as the signal provided to the first input signal terminal INP1 of the eighth-stage shift register unit SR8. The cascade output terminal GT of the third-stage shift register unit SR3 is electrically connected with the first input signal terminal INP1 of the ninth-stage shift register unit SR9. That is, the signal "st3" from the cascade output terminal GT of the third-stage shift register unit SR3 serves as the signal provided to the first input signal terminal INP1 of the ninth-stage shift register unit SR9. The rest can be done in a similar manner and will not be described in detail here.

For example, as shown in FIG. 16 and FIG. 15A, the cascade output terminal GT of the eighth-stage shift register unit SR8 is electrically connected with the reset signal terminal RST of the first-stage shift register unit SR1. That is, the signal "st8" of the cascade output terminal GT of the eighth-stage shift register unit SR8 serves as the signal provided to the reset signal terminal RST of the first-stage shift register unit SR1. The cascade output terminal GT of the ninth-stage shift register unit SR9 is electrically connected with the reset signal terminal RST of the second-stage shift register unit SR2. That is, the signal "st9" of the cascade output terminal GT of the ninth-stage shift register unit SR9 serves as the signal provided to the reset signal terminal RST of the second-stage shift register unit SR2. The rest can be done in a similar manner and will not be described in detail here.

In the gate driving circuit shown in FIG. 16, the cascade output terminals GT of the first to fourteenth-stage shift register units output signals "st1" to "st14". The driving output terminals ST of the first-stage shift register unit to the fourteenth-stage shift register unit output signals "gt1" to "gt14".

Of course, in actual applications, M can also be set to other values, which can be designed and determined according to the needs of actual applications, and are not limited here.

Moreover, when the shift register unit further includes the twenty-third transistor, each twenty-third transistor in the gate driving circuit can be electrically connected with the same one frame reset terminal. In this way, the twenty-third transistors in the gate driving circuit can be controlled to be turned on simultaneously before the start of a frame, so as to reset the first node as a whole.

Based on the same inventive concept, embodiments of the disclosure further provide a display apparatus, including a plurality of gate lines and the above-mentioned gate driving circuit provided by the embodiment of the disclosure. The principle of solving the problem of this display apparatus is similar to that of the foregoing gate driving circuit. Therefore, the implementation of this display apparatus can be referred to the implementation of the foregoing gate driving circuit, and the repetitive parts will not be described again.

During specific implementation, in the embodiments of the disclosure, one of gate lines can be set to correspond to one of shift register units in the gate driving circuit, so that one gate line can be electrically connected with the driving output terminal ST of one shift register unit in the gate driving circuit, to allow the shift register unit to provide a scanning signal to the gate line electrically connected with the shift register unit.

During specific implementation, in the embodiments of the disclosure, the display apparatus may be: a mobile phone, a tablet computer, a television, a monitor, a notebook computer, a digital photo frame, a navigator, or any other product or component with a display function. Other essential components of the display apparatus should be understood by those of ordinary skill in the art, and will not be described in detail here, nor should they be used to limit the disclosure.

In the shift register unit, the gate driving circuit and the display apparatus provided by the embodiments of the disclosure, the input circuit provides the signal from the second input signal terminal to the first node in response to the signal from the first input signal terminal, the reset circuit provides the signal from the first reference signal terminal to the first node in response to the signal from the reset signal terminal, the node control circuit, according to the signals from the second reference signal terminal and the third reference signal terminal, makes the level of the signal at the first node and the level of the signal at the first node opposite, the cascade output circuit provides the signal from the clock signal terminal to the cascade output terminal in response to the signal at the first node, and the driving output circuit provides the signal from the clock signal terminal to the driving output terminal in response to the signal at the first node. In this way, the load capacity of the driving output terminal can be improved.

Although the preferred embodiments of the disclosure have been described, those skilled in the art will be able to make additional changes and modifications to these embodiments once the basic inventive concepts are apparent. Therefore, it is intended that the appended claims be construed to include the preferred embodiments and all changes and modifications that fall within the scope of this disclosure.

Obviously, those skilled in the art can make various changes and modifications to the disclosed embodiments without departing from the spirit and scope of the disclosed embodiments. In this way, if these modifications and variations of the embodiments of the disclosure fall within the scope of the claims of the disclosure and equivalent technologies, the disclosure is also intended to include these modifications and variations.

What is claimed is:

1. A shift register unit, comprising:
    an input circuit configured to provide a signal from a second input signal terminal to a first node in response to a signal from a first input signal terminal;
    a reset circuit configured to provide a signal from a first reference signal terminal to the first node in response to a signal from a reset signal terminal;
    a node control circuit configured to at least adjust a level of a signal at the first node according to a signal from a second reference signal terminal and a signal from a third reference signal terminal;
    a cascade output circuit configured to provide a signal from a clock signal terminal to a cascade output terminal in response to the signal at the first node; and
    a driving output circuit configured to provide the signal from the clock signal terminal to a driving output terminal in response to the signal at the first node;
    wherein the node control circuit comprises: a fourth transistor, a fifth transistor, a sixth transistor, and a seventh transistor; wherein
    a gate and a first electrode of the fourth transistor are both electrically connected with the third reference signal terminal, and a second electrode of the fourth transistor is electrically connected with a gate of the fifth transistor;
    a first electrode of the fifth transistor is electrically connected with the third reference signal terminal, and a second electrode of the fifth transistor is electrically connected with a second node;
    a gate of the sixth transistor is electrically connected with the first node, a first electrode of the sixth transistor is electrically connected with the second reference signal terminal, and a second electrode of the sixth transistor is electrically connected with the second node; and
    a gate of the seventh transistor is electrically connected with the second node, a first electrode of the seventh transistor is electrically connected with the second reference signal terminal, and a second electrode of the seventh transistor is electrically connected with the first node.

2. The shift register unit according to claim 1, wherein the input circuit comprises a first transistor;
    wherein a gate of the first transistor is electrically connected with the first input signal terminal, a first electrode of the first transistor is electrically connected with the second input signal terminal, and a second electrode of the first transistor is electrically connected with the first node.

3. The shift register unit according to claim 2, wherein the first input signal terminal and the second input signal terminal are signal terminals independent of each other.

4. The shift register unit according to claim 1, wherein the reset circuit comprises a second transistor;
    wherein a gate of the second transistor is electrically connected with the reset signal terminal, a first electrode of the second transistor is electrically connected with the first reference signal terminal, and a second electrode of the second transistor is electrically connected with the first node.

5. The shift register unit according to claim 1, wherein the cascade output circuit comprises a third transistor;
    wherein a gate of the third transistor is electrically connected with the first node, a first electrode of the third transistor is electrically connected with the clock signal terminal, and a second electrode of the third transistor is electrically connected with the cascade output terminal.

6. The shift register unit according to claim 1, wherein the second reference signal terminal and the first reference signal terminal are the same one signal terminal; or
    the second reference signal terminal and the first reference signal terminal are signal terminals independent of each other, and a voltage of the second reference signal terminal is smaller than a voltage of the first reference signal terminal.

7. The shift register unit according to claim 1, wherein the driving output circuit comprises: an eighth transistor and a first capacitor; wherein
    a gate of the eighth transistor is electrically connected with the first node, a first electrode of the eighth transistor is electrically connected with the clock signal terminal, and a second electrode of the eighth transistor is electrically connected with the driving output terminal; and
    a first electrode plate of the first capacitor is electrically connected with the first node, and a second electrode plate of the first capacitor is electrically connected with the driving output terminal.

8. The shift register unit according to claim 1, wherein the driving output circuit is further configured to provide a signal from a fourth reference signal terminal to the driving output terminal in response to a signal at a second node.

9. The shift register unit according to claim 8, wherein the driving output circuit comprises: a ninth transistor, a tenth transistor and a second capacitor;
    wherein
    a gate of the ninth transistor is electrically connected with the first node, a first electrode of the ninth transistor is electrically connected with the clock signal terminal, and a second electrode of the ninth transistor is electrically connected with the driving output terminal;
    a gate of the tenth transistor is electrically connected with the second node, a first electrode of the tenth transistor is electrically connected with the fourth reference signal terminal, and a second electrode of the tenth transistor is electrically connected with the driving output terminal; and
    a first electrode plate of the second capacitor is electrically connected with the first node, and a second electrode plate of the second capacitor is electrically connected with the driving output terminal.

10. The shift register unit according to claim 8, wherein the first reference signal terminal and the fourth reference signal terminal are the same one signal terminal; or
    the first reference signal terminal and the fourth reference signal terminal are signal terminals independent of each other, and a voltage of the first reference signal terminal is smaller than a voltage of the fourth reference signal terminal.

11. The shift register unit according to claim 1, further comprising an eleventh transistor;
wherein a gate of the eleventh transistor is electrically connected with a second node, a first electrode of the eleventh transistor is electrically connected with a fifth reference signal terminal, and a second electrode of the eleventh transistor is electrically connected with the first node.

12. The shift register unit according to claim 11, wherein the fifth reference signal terminal and the first reference signal terminal are the same one signal terminal; or
the fifth reference signal terminal and the first reference signal terminal are terminals independent of each other, and a voltage of the fifth reference signal terminal is smaller than a voltage of the first reference signal terminal.

13. The shift register unit according to claim 1, wherein the node control circuit is further configured to adjust a level of a signal at a second node;
the second node comprises M second sub-nodes; and
the node control circuit comprises M sub-control circuits;
wherein an m-th sub-control circuit among the M sub-control circuits corresponds to an m-th second sub-node among the M second sub-nodes, M is an integer greater than or equal to 1, and m is an integer greater than or equal to 1 and smaller than or equal to M;
the m-th sub-control circuit is configured to adjust a signal at the m-th second sub-node and the signal at the first node;
the cascade output circuit is further configured to provide the signal from the second reference signal terminal to the cascade output terminal in response to signals at the M second sub-nodes; and
the driving output circuit is further configured to provide a signal from a fourth reference signal terminal to the cascade output terminal according to the signals at the M second sub-nodes.

14. The shift register unit according to claim 13, wherein:
the m-th sub-control circuit corresponds to an m-th third reference signal terminal;
the m-th sub-control circuit comprises: an m-th thirteenth transistor, an m-th fourteenth transistor, an m-th fifteenth transistor, an m-th sixteenth transistor and an m-th seventeenth transistor;
wherein
a gate and a first electrode of the m-th thirteenth transistor are both electrically connected with the m-th third reference signal terminal, and a second electrode of the m-th thirteenth transistor is electrically connected with a gate of the m-th fourteenth transistor;
a first electrode of the m-th fourteenth transistor is electrically connected with the m-th third reference signal terminal, and a second electrode of the m-th fourteenth transistor is electrically connected with the m-th second sub-node;
a gate of the m-th fifteenth transistor is electrically connected with the first node, a first electrode of the m-th fifteenth transistor is electrically connected with the second reference signal terminal, and a second electrode of the m-th fifteenth transistor is electrically connected with the m-th second sub-node;
a gate of the m-th sixteenth transistor is electrically connected with the first node, a first electrode of the m-th sixteenth transistor is electrically connected with the second reference signal terminal, and a second electrode of the sixteenth transistor is electrically connected with a gate of a second transistor; and
a gate of the m-th seventeenth transistor is electrically connected with the m-th second sub-node, a first electrode of the m-th seventeenth transistor is electrically connected with the second reference signal terminal, and a second electrode of the m-th seventeenth transistor is electrically connected with the first node.

15. The shift register unit according to claim 14, wherein the cascade output circuit comprises: an eighteenth transistor and M nineteenth transistors;
wherein an m-th nineteenth transistor among the M nineteenth transistors corresponds to the m-th second sub-node;
a gate of the eighteenth transistor is electrically connected with the first node, a first electrode of the eighteenth transistor is electrically connected with the clock signal terminal, and a second electrode of the eighteenth transistor is electrically connected with the cascade output terminal;
a gate of the m-th nineteenth transistor is electrically connected with the m-th second sub-node, a first electrode of the m-th nineteenth transistor is electrically connected with the second reference signal terminal, and a second electrode of the m-th nineteenth transistor is electrically connected with the cascade output terminal.

16. The shift register unit according to claim 14, wherein the driving output circuit comprises: a twentieth transistor, a third capacitor, and M twenty-first transistors;
wherein an m-th twenty-first transistor among the M twenty-first transistors corresponds to the m-th second sub-node;
a gate of the twentieth transistor is electrically connected with the first node, a first electrode of the twentieth transistor is electrically connected with the clock signal terminal, and a second electrode of the twentieth transistor is electrically connected with the driving output terminal;
a first electrode of the third capacitor is electrically connected with the first node, and a second electrode of the third capacitor is electrically connected with the driving output terminal; and
a gate of the m-th twenty-first transistor is electrically connected with the m-th second sub-node, a first electrode of the m-th twenty-first transistor is electrically connected with the fourth reference signal terminal, and a second electrode of the m-th twenty-first transistor is electrically connected with the driving output terminal.

17. The shift register unit according to claim 13, further comprising M twenty-second transistors;
wherein for an m-th twenty-second transistor among the M twenty-second transistors: a gate of the m-th twenty-second transistor is connected with the first input signal terminal, a first electrode of the m-th twenty-second transistor is electrically connected with the second reference signal terminal, and a second electrode of the m-th twenty-second transistor is electrically connected with the m-th second sub-node.

18. The shift register unit according to claim 13, further comprising a twenty-third transistor;
wherein a gate of the twenty-third transistor is electrically connected with an initial reset signal terminal, a first electrode of the twenty-third transistor is electrically connected with the second reference signal terminal, and a second electrode of the twenty-third transistor is electrically connected with the first node.

19. The shift register unit according to claim 1, further comprising: a cascade noise reduction unit configured to provide the signal from the second reference signal terminal to the reset signal terminal in response to a signal from the cascade output terminal.

\* \* \* \* \*